United States Patent
Lee et al.

(10) Patent No.: US 10,908,424 B2
(45) Date of Patent: Feb. 2, 2021

(54) SEE-THROUGH TYPE DISPLAY APPARATUS

(71) Applicant: SAMSUNG ELECTRONICS CO., LTD., Suwon-si (KR)

(72) Inventors: Changkun Lee, Seoul (KR); Wontaek Seo, Yongin-si (KR); Geeyoung Sung, Daegu (KR); Hongseok Lee, Seoul (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 254 days.

(21) Appl. No.: 16/130,613

(22) Filed: Sep. 13, 2018

(65) Prior Publication Data
US 2019/0324271 A1 Oct. 24, 2019

(30) Foreign Application Priority Data
Apr. 24, 2018 (KR) .......................... 10-2018-0047316

(51) Int. Cl.
*G02B 27/14* (2006.01)
*G02B 27/01* (2006.01)
(Continued)

(52) U.S. Cl.
CPC ........... *G02B 27/0172* (2013.01); *G02B 5/30* (2013.01); *G02B 27/0176* (2013.01); *G02B 27/283* (2013.01); *G02F 1/1313* (2013.01)

(58) Field of Classification Search
CPC ........... G02B 27/0172; G02B 27/0101; G02B 27/0178; G02B 27/017; G02B 27/0149;
(Continued)

(56) References Cited

U.S. PATENT DOCUMENTS 5,884,991 A * 3/1999 Levis ................. G02B 27/0994
348/E5.141
7,072,096 B2 * 7/2006 Holman ............... G02B 27/147
359/298
(Continued)

FOREIGN PATENT DOCUMENTS

CN 106537219 A 3/2017
KR 10-2017-0107750 A 9/2017

OTHER PUBLICATIONS

Xinda Hu et al. "High-resolution optical see-through multi-focal-plane head-mounted display using freeform optics" Optical Express, vol. 22, No. 11, Jun. 2, 2014 (pp. 13896-13903).
(Continued)

*Primary Examiner* — William R Alexander
*Assistant Examiner* — Tamara Y. Washington
(74) *Attorney, Agent, or Firm* — Sughrue Mion, PLLC

(57) ABSTRACT

A see-through type display apparatus includes an image forming unit; a relay optical system configured to transmit an image provided from the image forming unit and to form a primary imaging image; and an optical combiner configured to reimage the primary imaging image transmitted from the relay optical system and to form a multi-depth plane. The relay optical system includes a lens; a polarizer arranged at an angle with respect to an optical axis and configured to reflect light of light of a first polarization and transmit light of second polarization therethrough; a condensing mirror member configured to reflect and condense light incident from the polarizer; and a polarization converter configured to convert a polarization of light transmitted between the polarizer and the condensing mirror member.

20 Claims, 15 Drawing Sheets

(51) Int. Cl.
*G02B 5/30* (2006.01)
*G02B 27/28* (2006.01)
*G02F 1/13* (2006.01)

(58) Field of Classification Search
CPC .. G02B 27/0176; G02B 27/01; G02B 27/283; G02B 27/286; G02B 2027/0123; G02B 2027/0185; G02B 17/0615; G02B 5/30; G02B 5/3058; G02B 13/14; G02C 11/10; G02C 7/086; G02C 7/101; B60K 35/00; B60K 35/12; B60K 2370/1529; B60K 2370/67; B60K 2370/23; B60R 11/0229; B60R 1/04; B60R 1/00; B60R 2001/1215; G03B 21/2033; G03B 21/16; G06F 3/013; G06F 3/011; G06F 3/017; G02F 1/133528; G02F 1/1313; H04N 9/3129; H04N 13/344; H04N 5/7491; A61B 3/113
USPC ........................................................ 359/630
See application file for complete search history.

(56) References Cited

U.S. PATENT DOCUMENTS

| | | | |
|---|---|---|---|
| 8,767,305 B2 | 7/2014 | Spitzer et al. | |
| 9,063,331 B2 | 6/2015 | Bohn et al. | |
| 9,182,596 B2 | 11/2015 | Border et al. | |
| 9,494,800 B2 | 11/2016 | Border et al. | |
| 10,068,374 B2 | 9/2018 | Miller et al. | |
| 2001/0028456 A1* | 10/2001 | Nishi | G03F 7/70866 356/400 |
| 2006/0044515 A1* | 3/2006 | Suzuki | H04N 9/3105 353/20 |
| 2006/0121364 A1* | 6/2006 | Omura | H01L 21/027 430/5 |
| 2007/0273798 A1* | 11/2007 | Silverstein | G02B 27/1046 348/752 |
| 2009/0051833 A1* | 2/2009 | Watanabe | G02B 3/0056 349/8 |
| 2013/0070338 A1* | 3/2013 | Gupta | G02B 27/0172 359/485.05 |
| 2013/0314679 A1* | 11/2013 | Omura | G02B 17/0892 355/66 |
| 2014/0346374 A1* | 11/2014 | Yanagida | H01S 3/0064 250/504 R |
| 2015/0346495 A1 | 12/2015 | Welch et al. | |
| 2017/0269366 A1 | 9/2017 | Lee et al. | |
| 2017/0299869 A1* | 10/2017 | Urey | G02B 27/48 |
| 2018/0003962 A1* | 1/2018 | Urey | G02B 27/0093 |
| 2018/0122143 A1* | 5/2018 | Ellwood, Jr. | H04N 9/31 |
| 2019/0049732 A1* | 2/2019 | Lee | G02B 5/30 |
| 2019/0324271 A1* | 10/2019 | Lee | G02B 27/286 |
| 2019/0353898 A1* | 11/2019 | Amirsolaimani | G02B 6/42 |
| 2020/0004018 A1* | 1/2020 | Lee | G02B 5/3083 |

OTHER PUBLICATIONS

Kurt Akeley et al. "A Stereo Display Prototype with Multiple Focal Distances" ACM Transactions on Graphics, Aug. 2004 (pp. 804-813).

Gordon D. Love et al. "High-speed switchable lens enables the development of a volumetric stereoscopic display" Optics Express, vol. 17, No. 18, Aug. 31, 2009 (pp. 15716-15725).

Chang-Kim Lee et al. "Compact three-dimensional head-mounted display system with Savart plate" Optical Express, vol. 24, No. 17, Aug. 15, 2016 (pp. 19531-19544).

\* cited by examiner

SEE-THROUGH TYPE DISPLAY APPARATUS

CROSS-REFERENCE TO RELATED APPLICATION

This application claims priority from Korean Patent Application No. 10-2018-0047316, filed on Apr. 24, 2018, in the Korean Intellectual Property Office, the disclosure of which is incorporated herein in its entirety by reference.

BACKGROUND

1. Field

Apparatuses consistent with example embodiments relate to a see-through type display apparatus and more particularly to a see-through type display apparatus having a relay optical system.

2. Description of the Related Art

Recently, the development of electronic apparatuses and display apparatuses capable of implementing virtual reality (VR) has led to increased interest in applications using such apparatuses. As a next step for VR, a technology for implementing augmented reality (AR) and mixed reality (MR) has been researched.

Unlike VR that is based on a complete virtual world, AR is a display technique that shows the real world overlapped (combined) with virtual objects or information, thereby further "enhancing" reality. While VR may be limited in its application to fields such as games or virtual experience, AR is advantageous in that it may be applied to any of various real environments. In particular, AR has attracted attention as a next-generation display technology suitable for a ubiquitous environment or an Internet of Things (IoT) environment. AR may be an example of MR in that it provides a mixture of the real world with additional information (virtual world).

AR glasses-type apparatuses allow users to express virtual images and combine them with external foregrounds to create new experiences that have never been seen before. An AR glasses-type apparatus may operate as an information delivery medium by which experiences of individuals can be shared with a user wearing the glasses-type apparatus or as an independent apparatus used by a single user. In conjunction with interactions with the outside and with other people in real time, AR glasses-type apparatuses may function as tools to create new value throughout daily life situations. For a more realistic AR, it is desirable to display virtual images naturally: as soon from a near distance during typical work, and from a long distance when a user is looking at far objects.

Such an AR glasses-type apparatus may generally project images at a specific depth position in front of a user's eyes, in a two-dimensional plane. Such a two-dimensional plane image formed at a specific depth may allow a user to perceive a three-dimensional image due to a binocular parallax effect.

Currently commercialized VR and AR glasses-type apparatuses may form two-dimensional images with a single plane depth and generate a binocular parallax effect to represent three-dimensional images. Binocular parallax is considered the most important depth perception element in human 3D perception, but the absence of other depth perception elements is noted as a contributing factor that increases the apparent unnaturalness of scenes viewed via AR glasses-type apparatuses. In the case of VR apparatuses, all displayed environments are virtual environments. However, due to the characteristics of AR, real objects that provide all depth perception elements and virtual images that provide only binocular parallax are simultaneously observed. Therefore, when real objects and virtual images are alternately observed in real time, an environment in which all depth perception elements are provided and an environment in which only the binocular parallax depth perception element is provided, are alternately viewed. Therefore, this increases the apparent unnaturalness of the display. The biggest contributor to this apparent unnaturalness is the mismatch between vergence (the binocular angle formed by binocular parallax) and the accommodation in the lens of a viewer's eye.

As a simple example, it is assumed that an AR apparatus is designed so that a two-dimensional plane is located at a depth A and that a real object is located at a depth B. The AR apparatus adjusts the binocular parallax and displays a three-dimensional image at the depth B to express information of the real object. When a user views the real object, both the binocular parallax and the lens focal point match with the real object. Although a virtual image and the real object transmit the same binocular parallax information, when the virtual image is observed, since the virtual image is displayed at the depth A, the lens focal point changes from the depth B (at which the real object is located) to the depth A. Since the human eye is initially focused on the real object at the depth B, when the virtual image of the depth A is initially displayed, the viewer's focal point is not correctly focused, and it takes some time for the viewer to adjust his focus to the depth A. Therefore, there is vergence-accommodation mismatch problem. This is a very well known problem in existing 3D displays and the depth range of 3D images is limited to alleviate it. However, due to the characteristics of AR, since it is impossible to specify whether the real object and the virtual image interact with each other in real time, and it is impossible to know at what distance the real object is located, it is difficult to determine a degree of mismatch caused by a real-time interaction and thus it is very likely that the mismatch degree is large. Therefore, it is very important to minimize such mismatch to increase the user convenience when using AR glasses-type apparatuses. Many display technologies for expressing multiple focal points have been developed to reduce this vergence-accommodation mismatch. However, these display technologies have not been applied to actual products due to the high-speed driving of displays and multi-focal optics, the limitations of the viewing angle, the increase in computational amount, and the size.

SUMMARY

One or more example embodiments may provide a see-through type display apparatus capable of simultaneously providing a multi-focal characteristic and a wide viewing angle while having a small size, thereby increasing a visual convenience of a user and implementing a highly real augmented reality (AR).

Additional exemplary aspects and advantages will be set forth in part in the description which follows and, in part, will be apparent from the description, or may be learned by practice of the presented example embodiments.

According to an aspect of an example embodiment, a see-through type display apparatus includes an image forming unit; a relay optical system configured to transmit an image provided from the image forming unit and to form a primary imaging image; and an optical combiner configured to reimage the primary imaging image transmitted from the relay optical system and to form a multi-depth plane, wherein the relay optical system includes: a first lens provided on an incident side of the relay optical system and configured to condense light incident from the image forming unit; a first polarizer arranged at an angle with respect to an optical axis and configured to reflect light of a first polarization and transmit light of a second polarization; a condensing mirror member configured to reflect and condense light incident thereon from the first polarizer; and a polarization converter provided to convert a polarization of light transmitted between the first polarizer and the condensing mirror member, wherein the light reflected by the condensing mirror member and re-incident on the first polarizer has a polarization orthogonal to a polarization of the light incident from the first polarizer.

The image forming unit and the relay optical system may be arranged in a first direction, wherein the optical combiner is arranged in a second direction with respect to the relay optical system, wherein a path of light of an image provided from the image forming unit is directed towards the relay optical system along the first direction, and wherein a path of light of the primary imaging image by the relay optical system is directed towards the optical combiner along the second direction.

The image forming unit may be arranged inside or outside the relay optical system with respect to both eyes of a user wearing the see-through type display apparatus.

The condensing mirror member may include a concave mirror.

The condensing mirror member may include the concave mirror, the see-through type display apparatus further comprising: a second lens between the polarization converter and the concave mirror.

The condensing mirror member may include a doublet mirror including a lens and a concave mirror.

The first lens may include a single lens.

The first lens may include a doublet lens including a convex lens and a concave lens.

The first polarizer may be a wire grid polarizer.

The see-through type display apparatus may be applied to a glasses-type apparatus or a goggle-type apparatus.

The see-through type display apparatus may be applied to a head-mounted display apparatus.

The first polarizer has a polarization selective transmission reflective surface, wherein the polarization selective transmission reflective surface is inclined towards the image forming unit, wherein the condensing mirror member and the polarization converter include: a first condensing mirror member and a first polarization converter configured to reflect and condense the light of second polarization transmitted through the first polarizer, and convert the light into a first polarization; and a second condensing mirror member and a second polarization converter configured to reflect and condense the light of first polarization reflected by the first polarizer and convert the light into a second polarization, wherein the light of first polarization reentered from the first condensing mirror member and the first polarization converter onto the first polarizer is reflected by the first polarizer and directed toward the optical combiner, and wherein the light of second polarization reentered from the second condensing mirror member and the second polarization converter onto the first polarizer is transmitted through the first polarizer and is directed to the optical combiner.

The see-through type display apparatus may further include: a second polarizer, between the image forming unit and the first polarizer, configured to transmit only light having the second polarization to be allow incident on the first polarizer.

The image forming unit may include: a first display configured to form a first image; a second display configured to form a second image; and a beam splitter configured to transmit light of the first image and reflect light of the second image to thereby direct the first and second images towards the relay optical system, and wherein the image forming unit is configured to form a multi-focal point.

The first polarizer may have a polarization selective transmission reflective surface, wherein the polarization selective transmission reflective surface faces away from the image forming unit.

The image forming unit may include: a single display configured to form an image, wherein the first polarizer has a polarization selective transmission reflective surface, wherein the polarization selective transmission reflective surface faces away from the image forming unit; and a polarization rotator, between the image forming unit and the first polarizer, configured to convert a polarization state of light passing therethrough into a first polarization and a second polarization according to a time sequence, wherein the condensing mirror member and the polarization converter comprise: when the light of second polarization is incident from the polarization rotator, a first condensing mirror member and a first polarization converter configured to reflect and condense the light of second polarization transmitted through the first polarizer and convert the light into a first polarization to reenter the first polarizer; and when the light of first polarization is incident from the polarization rotor, a second condensing mirror member and a second polarization converter configured to reflect and condense the light of first polarization reflected by the first polarizer and convert the light into a second polarization to reenter the first polarizer, wherein the condensing mirror member and the polarization converter are configured to implement a multi-focal point, wherein the light of first polarization reentered into the first polarizer from the first condensing mirror member and the first polarization converter is reflected by the first polarizer and directed toward the optical combiner, and wherein the light of second polarization reentered into the first polarizer from the second condensing mirror member and the second polarization converter is transmitted through the first polarizer and directed toward the optical combiner.

The image forming unit may include: a single display configured to form an image, wherein the first polarizer has a polarization selective transmission reflective surface, wherein the polarization selective transmission reflective surface faces away from the image forming unit; a polarization rotator, between the first polarizer and the polarization converter, configured to selectively change a polarization state of the incident light according to on and off states; and a birefringent lens, between the polarization rotator and the polarization converter, wherein the birefringent lens has different refractive indexes with respect to different polarizations of the incident light.

The image forming unit may include a single display configured to form an image, and wherein the condensing mirror member is configured to vary focusing power to change a focus of the relay optical system.

The condensing mirror member may include a programmable mirror device capable of modifying the focusing power within a certain range.

The programmable mirror device may include a Micro-Electro-Mechanical systems (MEMS) mirror or a liquid crystal-based focus variable lens.

BRIEF DESCRIPTION OF THE DRAWINGS

These and/or other example aspects and advantages will become apparent and more readily appreciated from the following description of example embodiments, taken in conjunction with the accompanying drawings in which.

DETAILED DESCRIPTION

Figure 1:
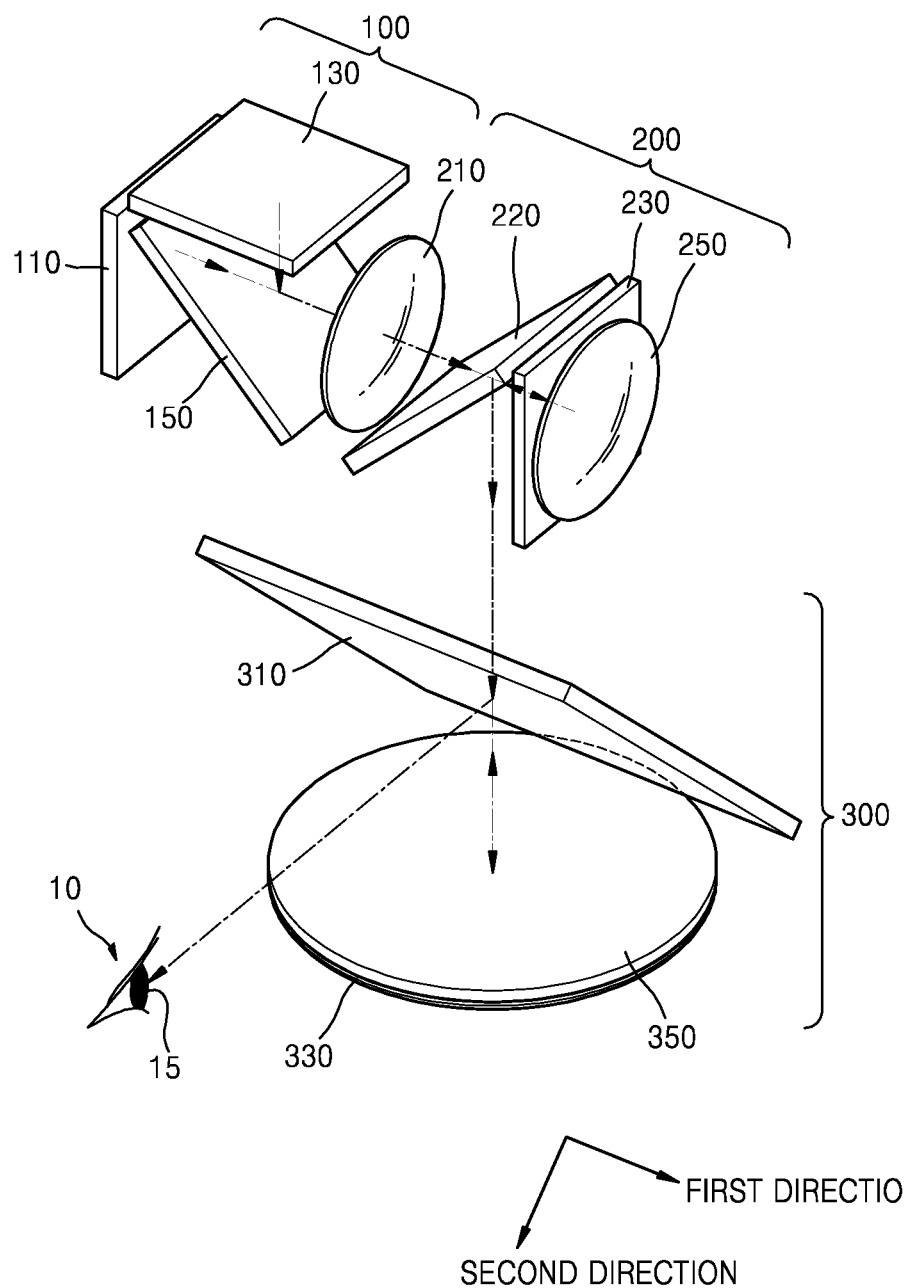
FIG. 1 is a perspective view schematically showing a see-through type display apparatus according to an example embodiment.

Hereinafter, see-through type display apparatuses according to example embodiments will be described with reference to the accompanying drawings. In the drawings, like reference numerals refer to like elements, and the sizes of elements may be exaggerated for clarity of illustration. Embodiments described herein are for illustrative purposes only, and various modifications may be made therefrom.

Figure 2:
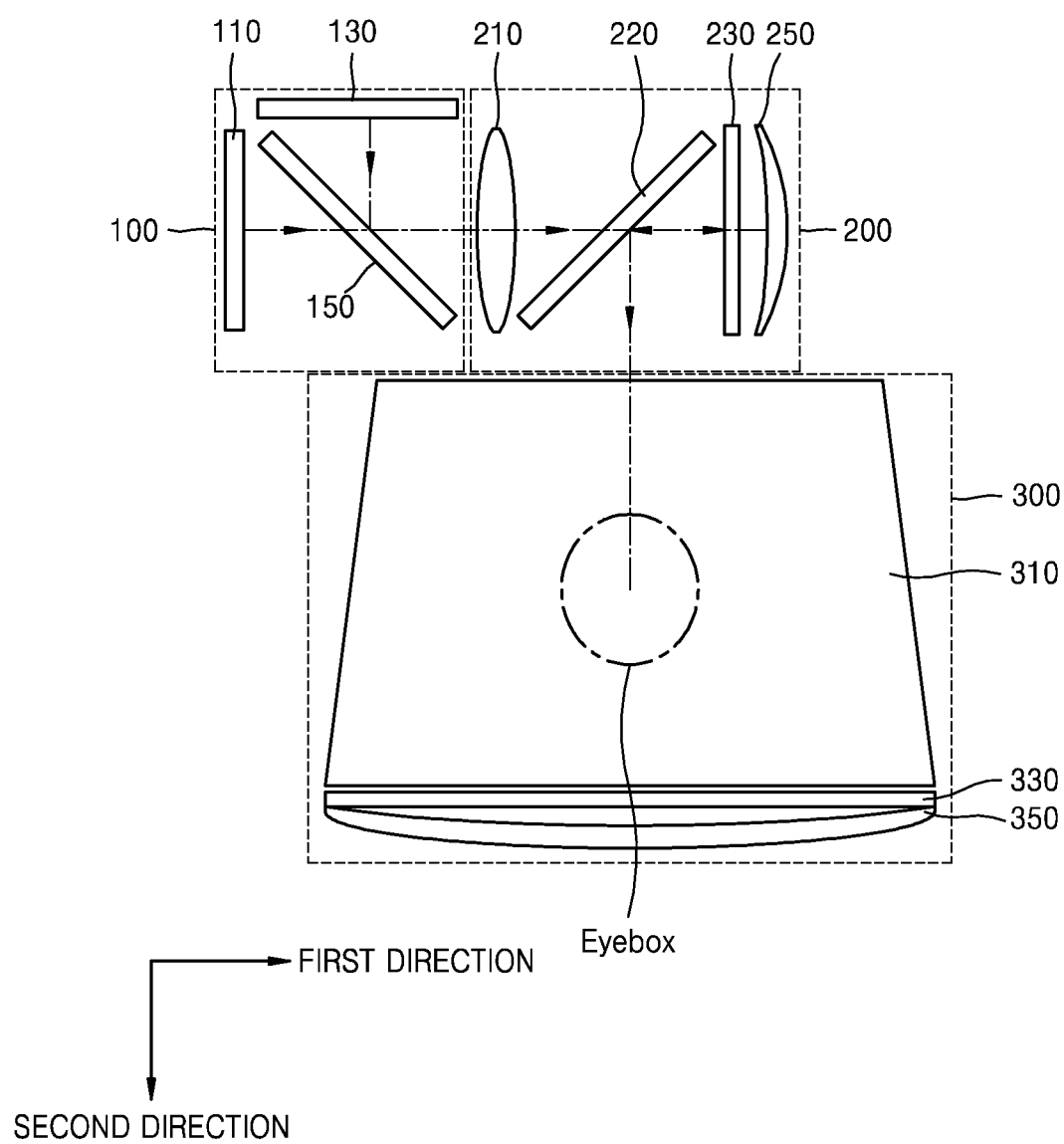
FIGS. 2 and 3 schematically show a configuration of FIG. 1.
Figure 3:
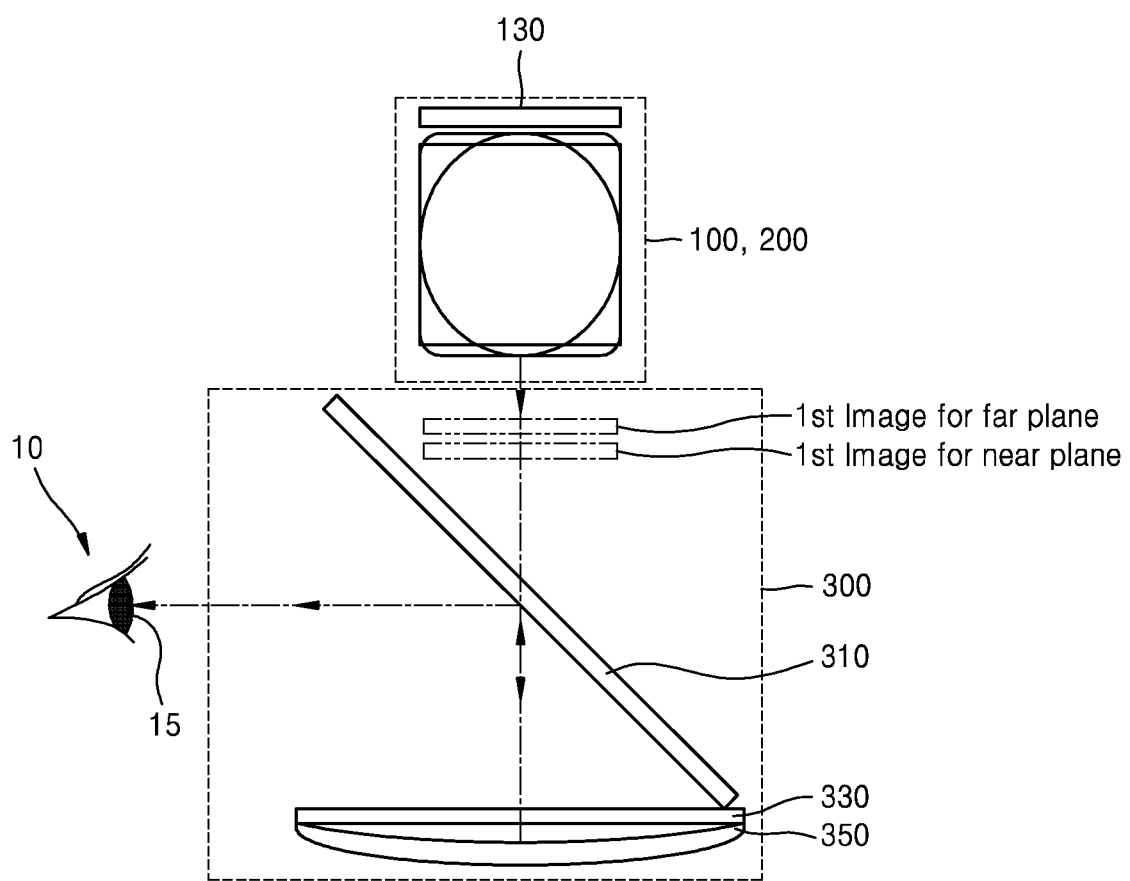

FIG. 1 is a perspective view schematically showing a see-through type display apparatus according to an example embodiment. FIGS. 2 and 3 schematically show a configuration of FIG. 1.

Referring to FIGS. 1 to 3, the see-through type display apparatus (also called a transparent type display apparatus) may include an image forming unit 100, a relay optical system 200 transmitting an image output from the image forming unit 100 and forming a primary imaging image, and an optical combiner 300 reimaging the primary imaging image transmitted by the relay optical system 200 and producing a multi-depth plane.

Regarding the see-through type display apparatus according to an example embodiment, the image forming unit 100 and the relay optical system 200 may be arranged, one after the other, along an optical path extending in a first direction, and the optical combiner 300 may be arranged with an optical axis extending in a second direction. The image forming unit 100 may be provided such that a path of light of the image, output from the image forming unit 100 and directed toward the relay optical system 200, extends along the first direction. In an example embodiment, when the image forming unit 100 is configured such that first and second images are combined by a beam splitter 150, the see-through type display apparatus is provided such that a path of light from the first and second images, combined by the beam splitter 150, extends along the first direction. The see-through type display apparatus may be provided such that the path of the light of the primary imaging image, transmitted by the relay optical system 200 toward the optical combiner 300, extends along the second direction. The second direction may be perpendicular to the first direction. In an example embodiment, the relay optical system 200 or the optical combiner 300 may be configured such that the second direction forms an angle with the first direction other than a perpendicular angle.

According to an example embodiment, the image forming unit 100 may include a display 110 forming the first image, a display 130 forming the second image, and the beam splitter 150 combining paths of light of the first and second images by transmitting light of one of the first and second images formed by the displays 110 and 130 and reflecting light of the other one of the first and second images and directing the combined light to the relay optical system 200. Thus, the image forming unit 100 may implement a multi-focal point. To this end, the display 110 and the display 130 may be arranged such that a light emission surface of the first image and a light emission surface of the second image form a right angle. The image forming unit 100 may also include a multi-focal module for implementing a multi-focal point.

The displays 110 and 130 may each include a light source and a display device modulating light output from the light source according to image information to form an image, and may further include an optical system enlarging or reducing the image and transmitting the image to a predetermined position. The display device may include, according to an example embodiment, a liquid crystal on silicon (LCoS) device, a liquid crystal display (LCD) device, an organic light emitting diode (OLED) display device, a digital micromirror device (DMD), a next generation display device such a micro LED, a quantum dot (QD) LED, or the like.

The image forming unit 100 and the relay optical system 200 may be disposed along the same optical path, extending in the first direction, that is, a horizontal direction. The relay optical system 200 and the optical combiner 300 may be disposed along the same optical path, extending in the second direction, that is, a vertical direction.

The relay optical system 200 may include a first lens 210 provided on an incident side of the relay optical system 200 to focus the light incident thereon from the image forming unit 100, a first polarizer 220 disposed at an angle with respect to the optical axis of the first lens 210 to reflect light of a first polarization and transmit light of a second polarization, a condensing mirror member 250 reflecting and focusing the light incident from the first polarizer 220, and a polarization converter 230 which changes a polarization of the light transmitted between the first polarizer 220 and the condensing mirror member 250. The polarization converter 230 may change the polarization of light such that the light reflected by the condensing mirror member 250 and re-incident on the first polarizer 220 is made to have a polarization orthogonal to a polarization of the light incident from the first polarizer 220.

The first lens 210 may be, according to an example embodiment, a single convex lens. Alternatively, the first lens 210 may include a convex lens having a doublet structure to reduce a chromatic aberration. By positioning the first lens 210 on an incident side, on which a multi-focus image of the relay optical system 200 is incident as described above, the first lens 210 may focus light emitted from the first and second displays 110 and 130 of the image forming unit 100 into the relay optical system 200. As shown in FIG. 2, the focused image information may comprise the polarization component of the light transmitted through the first polarizer 220, and this light having the polarization component transmitted through the first polarizer 220 may thus be relayed by the relay optical system 200.

The first polarizer 220 may have a polarization selective transmission-reflective surface disposed at an angle with respect to the optical axis of the light incident from the image forming unit 100, and the first polarizer may transmit or reflect the incident light according to a polarization thereof. The first polarizer 220 may be provided to reflect the light of first polarization and transmit the light of second polarization. The first polarizer 220 may be of a plate-type and may include, according to an example embodiment, a wire grid polarizer. In an example embodiment, the first polarization and the second polarization may be linear polarizations orthogonal to each other. Due to use of the plate-type first polarizer 220, for example, the wire grid polarizer, effective relay imaging may be enabled in a small space.

FIGS. 1 to 3 show an example in which the polarization selective transmission-reflective surface of the first polarizer 220 is inclined in a direction away from the image forming unit 100, light traveling from the image forming unit 100 is transmitted through the polarization selective transmission-reflective surface of the first polarizer 220 and directed to the condensing mirror member 250, and the light reflected from the condensing mirror member 250 is reflected by the polarization selective transmission-reflective surface of the first polarizer 220 and directed to the optical combiner 300.

As shown in FIGS. 1 to 3, when the polarization selective transmission-reflective surface of the first polarizer 220 is inclined such that the surface receiving light incident from the image forming unit 100 faces away from the optical combiner, even when the light incident to the first polarizer 220 from the image forming unit 100 includes a first polarization component, in addition to the second polarization component that is transmitted through the polarization selective transmission-reflective surface of the first polarizer 220, since the light of the first polarization is reflected by the polarization selective transmission-reflective surface of the first polarizer 220, it is reflected away from the optical combiner 300. Thus, the light of the first polarization may be prevented from acting as noise.

The polarization converter 230 may change a polarization of the incident light. For example, incident light having a linear polarization may be converted into light having a circular polarization, and incident light having a circular polarization may be converted into light having a linear polarization. In an example embodiment, the polarization converter 230 may be a quarter waveplate.

The condensing mirror member 250 may reflect and condense the light incident from the first polarizer 220 and make the light reenter the first polarizer 220 and may include a concave mirror. In an example embodiment, the concave mirror may include a spherical concave mirror or a meniscus mirror.

FIGS. 1 to 3 show an example of a polarization and optical configuration of a see-through type display apparatus in which the light transmitted from the image forming unit 100 to the relay optical system 200 is transmitted through the first polarizer 220 and directed to the polarization converter 230 and the condensing mirror member 250, and the light reflected and focused by the polarization converter 230 and the condensing mirror 250 is reflected by the first polarizer 220 toward the optical combiner 300. However, this is just an example and the example embodiment is not limited thereto. That is, a see-through type display apparatus may have a polarization and optical configuration in which the light transmitted from the image forming unit 100 to the relay optical system 200 is reflected by the first polarizer 220 toward the polarization converter 230 and the condensing mirror member 250 and the light reflected and focused by the polarization converter 230 and the condensing mirror 250 is transmitted through the first polarizer 220 to the optical combiner 300.

As illustrated in FIGS. 1 to 3, when the image light transmitted from the image forming unit 100 to the relay optical system 200 has the second polarization, it is condensed by the first lens 210, transmitted through the first polarizer 220, and incident on the polarization converter 230. The light of the second polarization is transmitted through the polarization converter 230 and thereby changed to have a predetermined polarization, for example, one circular polarization. The light having the one circular polarization is reflected by the condensing mirror member 250 and changed to have a different, other circular polarization orthogonal to the one circular polarization. The light of the other circular polarization is again transmitted through the polarization converter 230 and thereby changed into light having the first polarization orthogonal to the second polarization. The light of the first polarization is reflected by the first polarizer 220 and directed to the optical combiner 300.

As shown in FIGS. 1 to 3, the optical combiner 300 may include, according to an example embodiment, a path changing member 310 and a condensing mirror member 350, focusing light of an image on an observer's eyes. The condensing mirror member 350 may include, according to an example embodiment, a concave mirror, e.g., a spherical concave mirror or a meniscus mirror.

Since the light transmitted from the relay optical system 200 to the optical combiner 300 is polarized, the see-through type display apparatus according to the present example embodiment may include a polarization beam splitter, for example, a plate type polarization beam splitter as the path changing member 310 and may further include a polarization converter 330, for example a quarter waveplate, disposed between the path changing member 310 and the condensing mirror member 350 to increase light efficiency. In an example embodiment, the path changing member 310 may include a wire grid polarizer.

In an example embodiment, the light of the first polarization transmitted from the relay optical system 200 may be transmitted through the path changing member 310, and incident on the polarization converter 330. The light of the first polarization is transmitted through the polarization converter 330, and is thereby changed to have one circular polarization. The light having the on circular polarization is reflected by the condensing mirror member 350 and changed to have a different, other circular polarization, orthogonal to the one circular polarization. The light of the other circular polarization is again transmitted through the polarization converter 330 and thereby changed into light having the second polarization orthogonal to the first polarization. The light of the second polarization is reflected by the path changing member 310 and directed to an observer. Reference numerals 10 and 15 of FIG. 3 denote an observer and an eye of the observer, respectively.

The path changing member 310 may include a translucent path changing member instead of the polarizing beam splitter. In this case, the polarization converter 330 may be omitted.

Light from an environment in front of the observer 10, for example light from the real environment RE, may be transmitted through the path changing member 310 toward the observer 10. Since the light from the environment in front of the observer 10 includes both components of the first polarization and the second polarization, the light is transmitted through the path changing member 310 toward the observer 10. Additionally, a polarizer (not shown) may be further provided such that the light from the environment in front of the observer 10 is converted to light of the first polarization transmitted through the path changing member 310. In this case, only the light of the first polarization reaches the observer 10.

According to the example embodiment described above, a multi-focus image may be primarily imaged through the combination of the first lens 210 and the condensing mirror member 250 of the relay optical system 200, and an optical path of sufficient length may be obtained by applying the first polarizer 220, and thus, the small size of the see-through type display apparatus may be maintained. Accordingly, a relay image may be formed in the optical combiner 300 connected in the second direction, that is, the vertical direction as shown in the figures, and reimaging may be performed at a position close to the optical combiner 300. Thus, power of the optical combiner 300 may increase, and thus it is possible to provide a wide viewing angle.

Figure 4:
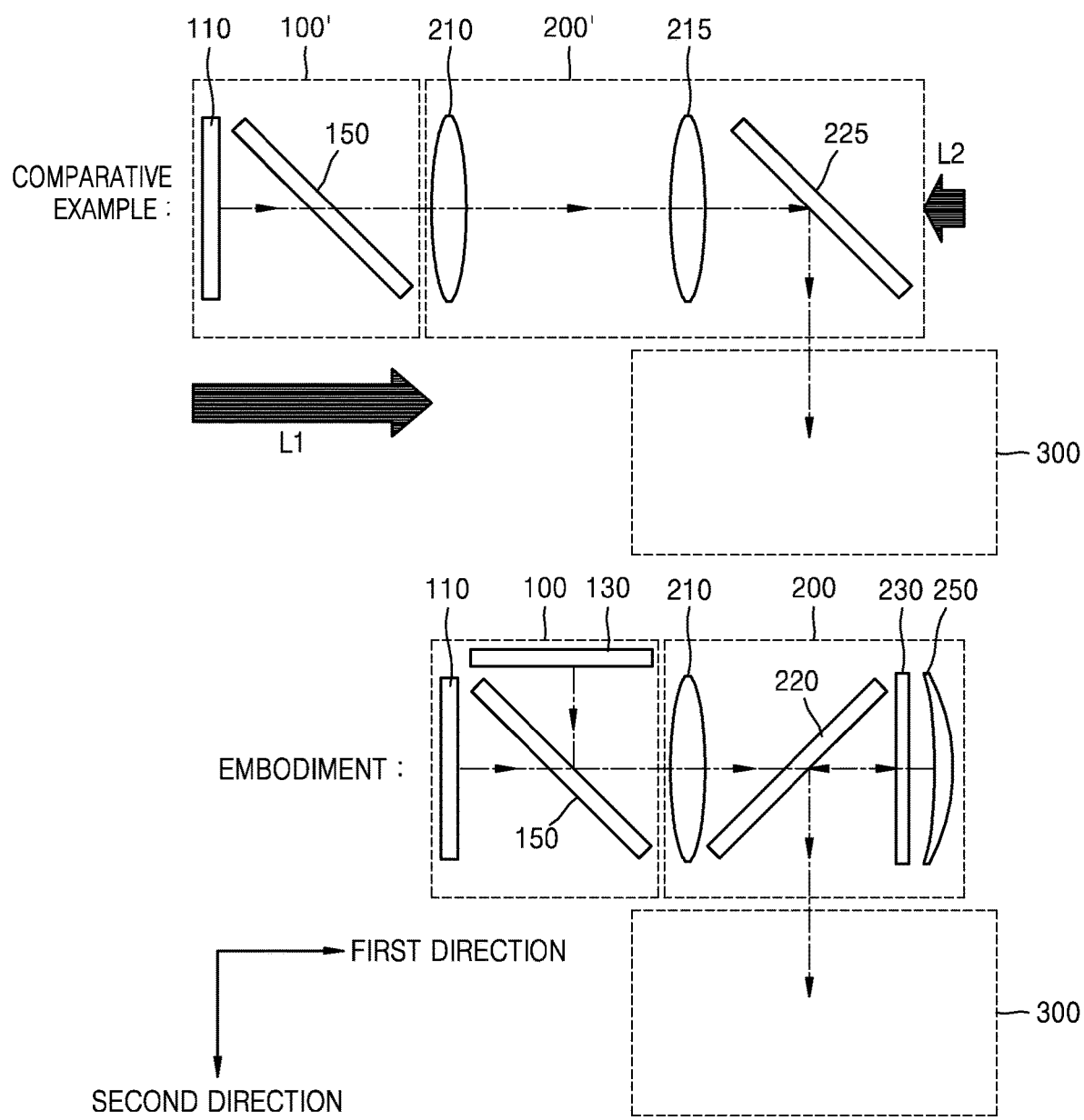
FIG. 4 shows a comparison of a see-through type display apparatus according to an example embodiment and a see-through type display apparatus according to a comparative example.

Also, according an example embodiment, as seen in a comparative example of FIG. 4, the relay optical system 200 may have a structure including the first polarizer 220 and the condensing mirror member 250, and thus, a sufficient optical path may be ensured, thereby implementing a see-through type display apparatus having a comparatively small size.

Referring to FIG. 4, a relay optical system 200' of the comparative example may include a refraction lens 215 and a reflection mirror 225.

In other words, the relay optical system 200' of the comparative example may include the refraction lens 215 and the reflection mirror 225 as configurations of functions of the first polarizer 220, the polarization converter 230, and the condensing mirror member 250 of the relay optical system 200 according to an example embodiment.

According to the relay optical system 200' of the comparative example, since a distance between the first lens 210 and the refraction lens 215 is required for securing a desired optical path, the length of the relay optical system 200' is increased.

In contrast, in the relay optical system 200 according to an example embodiment, the condensing mirror member 250 is used in place of the refraction lens 215 and the reflecting mirror 225, and the first polarizer 220 and the polarization converter 230 may be disposed between the first lens 210 and the condensing mirror member 250, and thus the length of the relay optical system 200 may be reduced, thereby implementing a see-through type display apparatus, such as an AR glasses-type apparatus, having a small size. Referring to the example of FIG. 4, in the relay optical system 200 according to an example embodiment, a length of the image forming unit 100 may be reduced by L1 and a length of an opposite side thereof may be increased by L2 as compared with the relay optical system 200' of the comparative example. Accordingly, in FIG. 4, the length of the relay optical system 200 according to an example embodiment may be reduced by L1-L2 (where L1>L2) as compared with the length of the relay optical system 200' of the comparative example.

Figure 5:
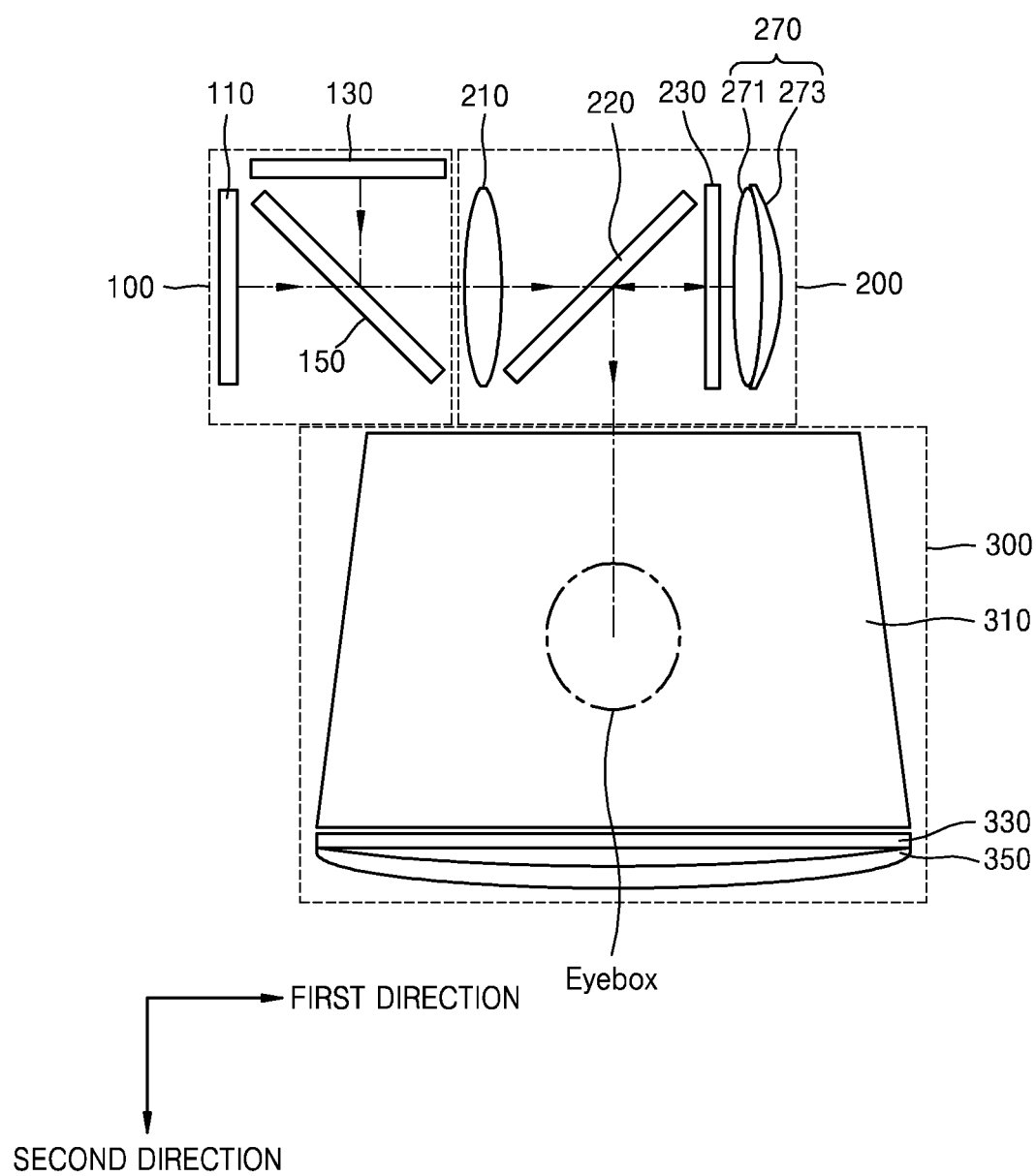
FIG. 5 schematically shows a see-through type display apparatus according to another example embodiment.

FIG. 5 schematically shows a see-through type display apparatus according to another example embodiment.

The see-through type display apparatus of the example embodiment of FIG. 5 is different from the see-through type display apparatus of the example embodiment of FIG. 2 in that the see-through type display apparatus of FIG. 5 includes a doublet mirrored condensing mirror member 270, including a convex lens 271 and a concave mirror 273, instead of the single concave condensing mirror member 250.

When the doublet mirror including the convex lens 271 and the concave mirror 273 capable of reducing a chromatic aberration are used as the condensing mirror member 270, an optical aberration that may occur in the see-through type display apparatus may be reduced. Thus, a degree of freedom of selecting a lens material may increase.

Figure 6:
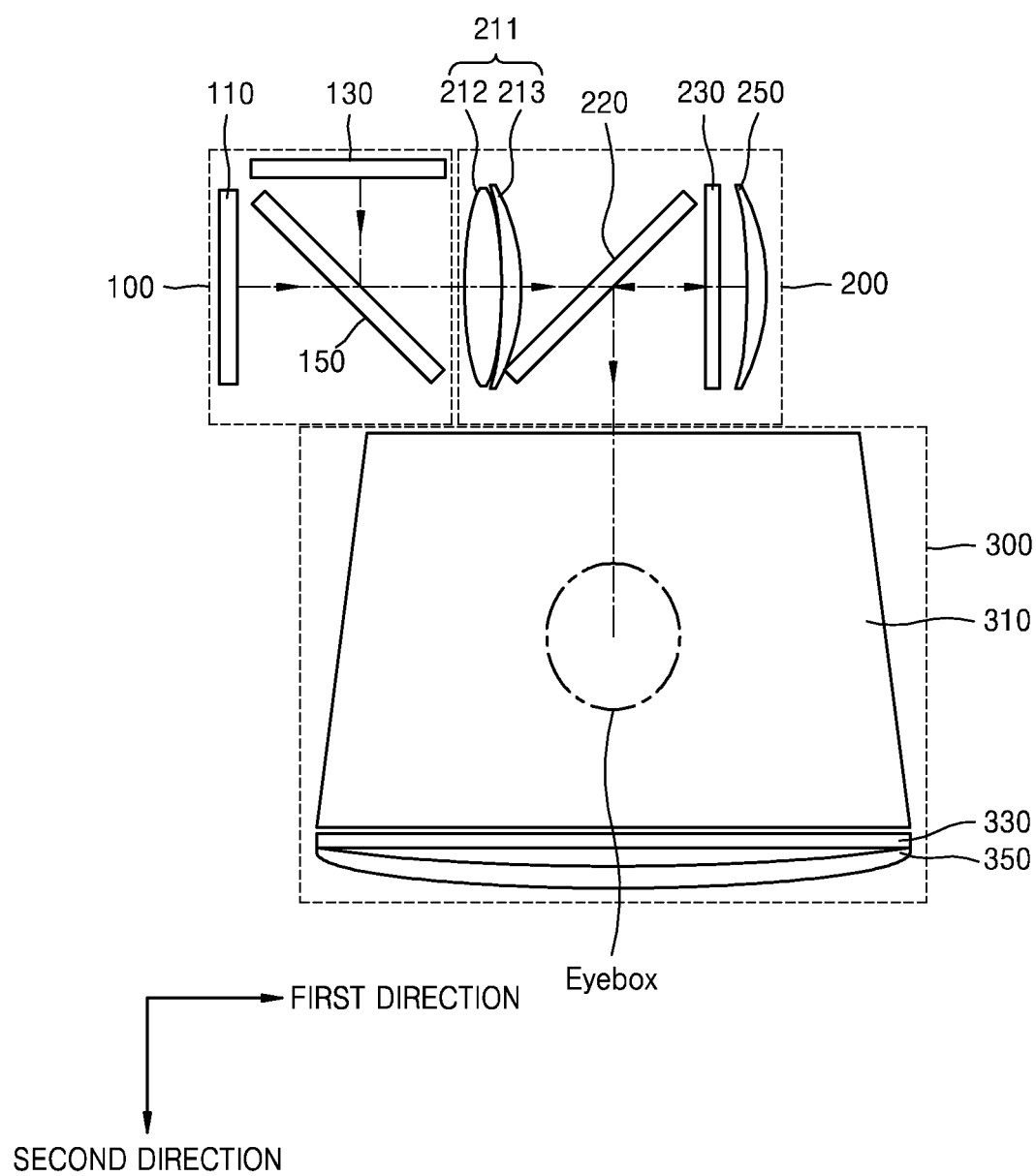
FIG. 6 schematically shows a see-through type display apparatus according to another example embodiment.

FIG. 6 schematically shows a see-through type display apparatus according to another example embodiment.

The see-through type display apparatus of the example embodiment of FIG. 6 is different from the see-through type display apparatus of the example embodiment of FIG. 2 in that the see-through type display apparatus of FIG. 6 includes a first lens 211 of a doublet lens including a convex lens 212 and a concave lens 213, instead of the first lens 210 of a single lens.

When the doublet lens including the convex lens 212 and the concave lens 213 capable of reducing a chromatic aberration is used as the first lens 211, an optical aberration that may occur in the see-through type display apparatus may be reduced. Thus, a degree of freedom of selecting a lens material may increase.

Figure 7:
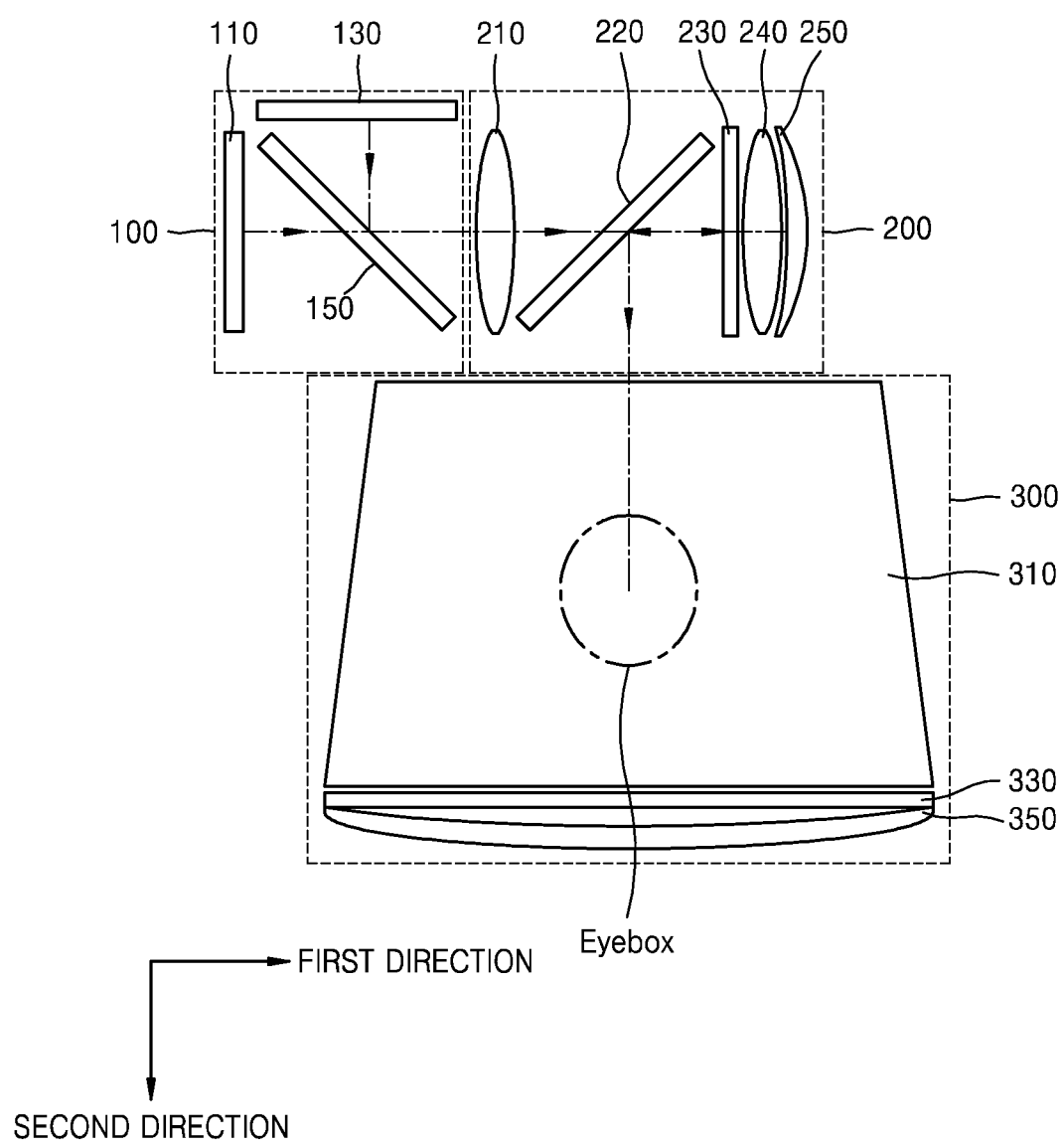
FIG. 7 schematically shows a see-through type display apparatus according to another example embodiment.

FIG. 7 schematically shows a see-through type display apparatus according to another example embodiment.

The see-through type display apparatus of the example embodiment of FIG. 7 is different from the see-through type display apparatus of the example embodiment of FIG. 2 in that a second lens 240 is further inserted between the first polarizer 220 and the condensing mirror member 250, which is a concave mirror. In this regard, the second lens 240 may include a single lens, a doublet lens, or an anisotropic lens. FIG. 7 illustrates that the second lens 240 may be a single lens.

When an additional optical element is positioned between the first polarizer 220 and the condensing mirror member 250 of the concave mirror, as shown, image information is transmitted through the optical element two times. Therefore, when an optical element having a specific power, such as the second lens 240, is inserted at this position, the optical path length is not increased, thereby reducing the overall number of optical elements for the see-through type display apparatus and increasing a degree of design freedom.

Figure 8:
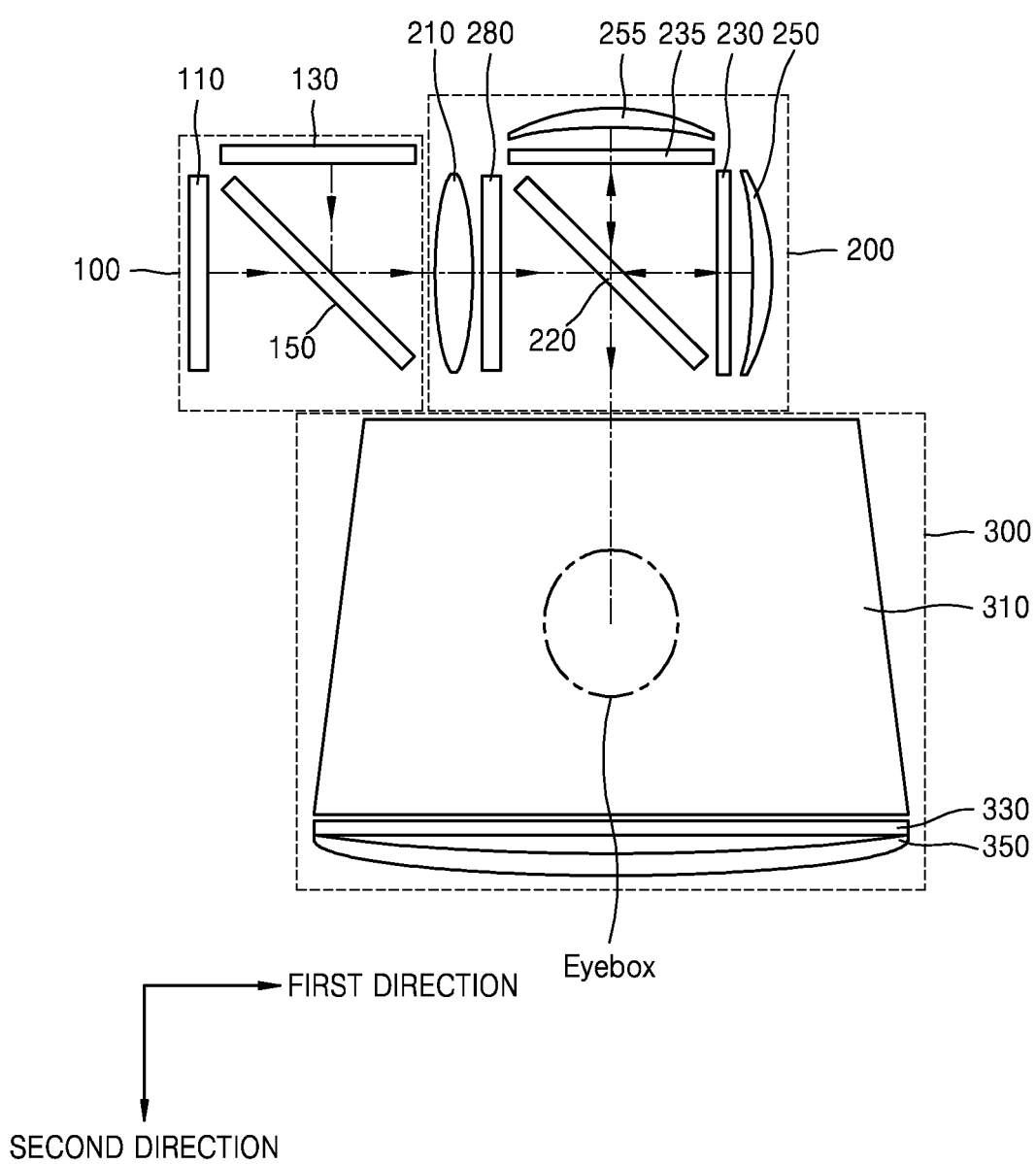
FIG. 8 schematically shows a see-through type display apparatus according to another example embodiment.

FIG. 8 schematically shows a see-through type display apparatus according to another example embodiment The see-through type display apparatus of the example embodiment of FIG. 8 is different from the see-through type display apparatus of the example embodiment of FIG. 2 in that a polarization selective transmission-reflective surface of the first polarizer 220 is inclined toward the image forming unit 100 (i.e. the light-incident surface of the first polarizer 220, on which light transmitted from the image forming unit 100 is incident, is inclined to face both the image forming unit 100 and the optical combiner 300) and the see-through type display apparatus of FIG. 8 further includes a condensing mirror member 255 and a polarization converter 235 on a side of the first polarizer 200, opposite the optical combiner 300.

According to the example embodiment of FIG. 8, since the polarization selective transmission-reflective surface of the first polarizer 220 is inclined to face both the image forming unit 100 and the optical combiner 300, when light transmitted from the image forming unit 100 to the first polarizer 220 includes a component of a first polarization (different from the second polarization which is transmitted through the polarization selective transmission-reflective surface of the first polarizer 220), light of the first polarization transmitted from the image forming unit 100 is reflected by the polarization selective transmission-reflective surface of the first polarizer 220 and directed toward the optical combiner 300, and thus, the light may act as noise.

Therefore, to prevent such noise, the see-through type display apparatus of FIG. 8 may further include a second polarizer 280, between the image forming unit 100 and the first polarizer 220, such that light incident on the first polarizer 220 from the image forming unit 100 includes only light having the second polarization. The second polarizer 280 may include, according to an example embodiment, a linear polarizer.

According to the example embodiment of FIG. 8, the light traveling from the image forming unit 100 is transmitted through the second polarizer 280 and is thereby converted to light having only the second polarization, is thus transmitted through the polarization selective transmission-reflective surface of the first polarizer 220, and is incident on the polarization converter 230. The light may be converted into, for example, one circular polarization by the polarization converter 230, is changed to an other circular polarization, orthogonal to the one circular polarization, upon reflection by the condensing mirror member 250, and is converted to light of the first polarization, orthogonal to the second polarization, upon retransmission through the polarization converter 230. The light of first polarization is then reflected by the polarization selective transmission-reflective surface of the first polarizer 220 and is incident on the polarization converter 235 disposed on a side of the first polarizer 220, opposite the optical combiner 300. The light is converted into, for example, one circular polarization upon transmission through the polarization converter 235, is converted into the other circular polarization upon reflection by the condensing mirror member 255, and is converted in light of the second polarization, orthogonal to the first polarization, upon retransmission through the polarization converter 235. The light of second polarization is transmitted through the polarization selective transmission-reflective surface of the first polarizer 220 and is directed to the optical combiner 300.

When the polarization selective transmission-reflective surface of the first polarizer 220 is inclined such that it faces both the image forming unit 100 and the optical combiner, and two pairs of condensing mirror members 250 and 255 and the polarization converters 230 and 235 are used, the length of the optical path is doubled. Thus, a degree of freedom of optical design may be high, thereby easily enhancing the performance of the see-through type display apparatus.

In the example embodiment shown in FIG. 8, the first lens 210 may be a single lens and the condensing mirror members 250 and 255 may be concave mirrors. However, this is just an example. For example, the first lens 210 may be a doublet lens including a convex lens and a concave lens. Also, a doublet mirror including a convex lens and a concave mirror may be provided as one or both of the condensing mirror members 250 and 255, or a concave mirror may be provided as one or both of the condensing mirror members 250 and 255 and the second lens 240 as FIG. 7 may be further provided between the first polarizer 220 and a concave mirror.

Figure 9:
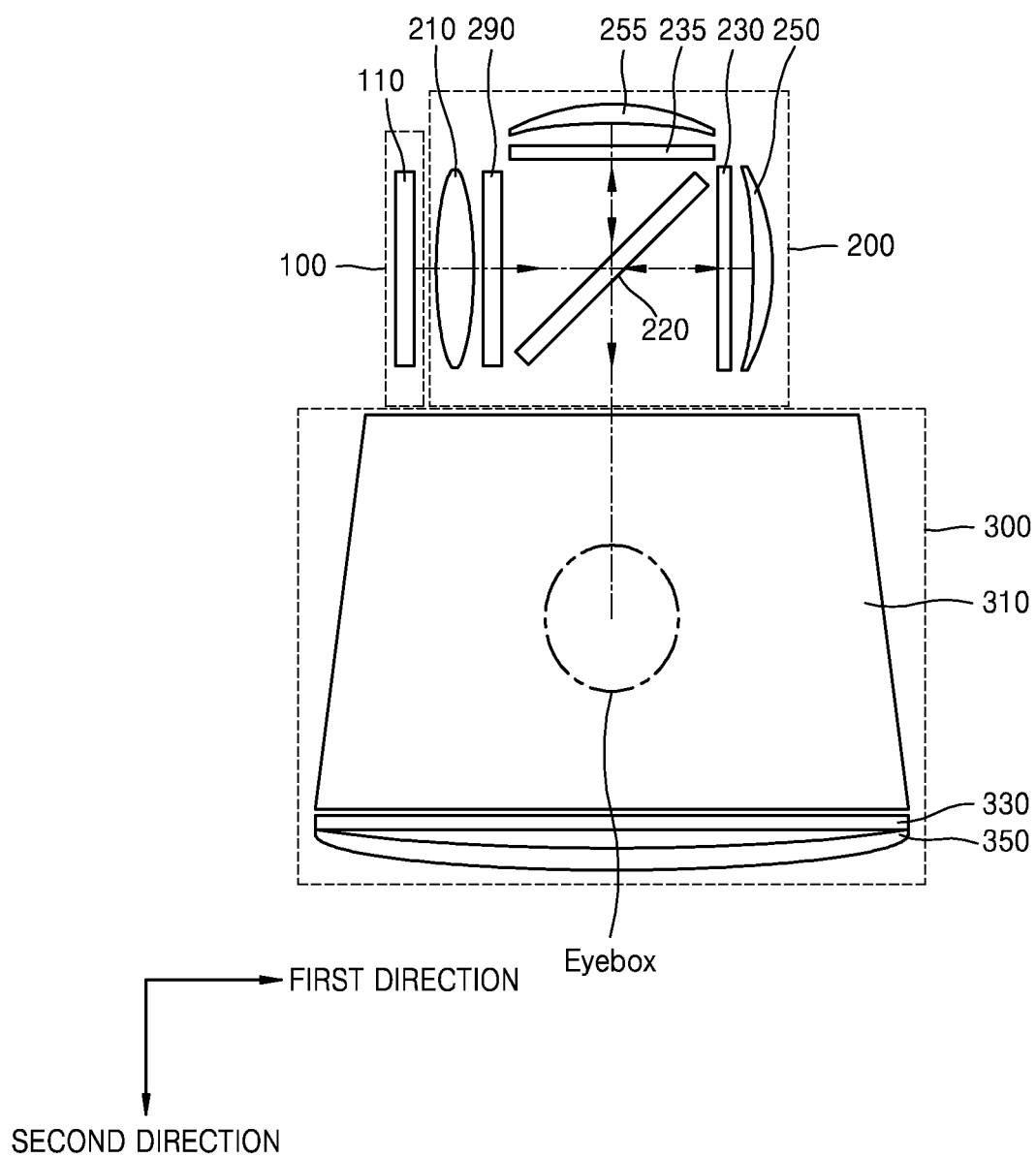
FIG. 9 schematically shows a see-through type display apparatus according to another example embodiment.
Figure 10:
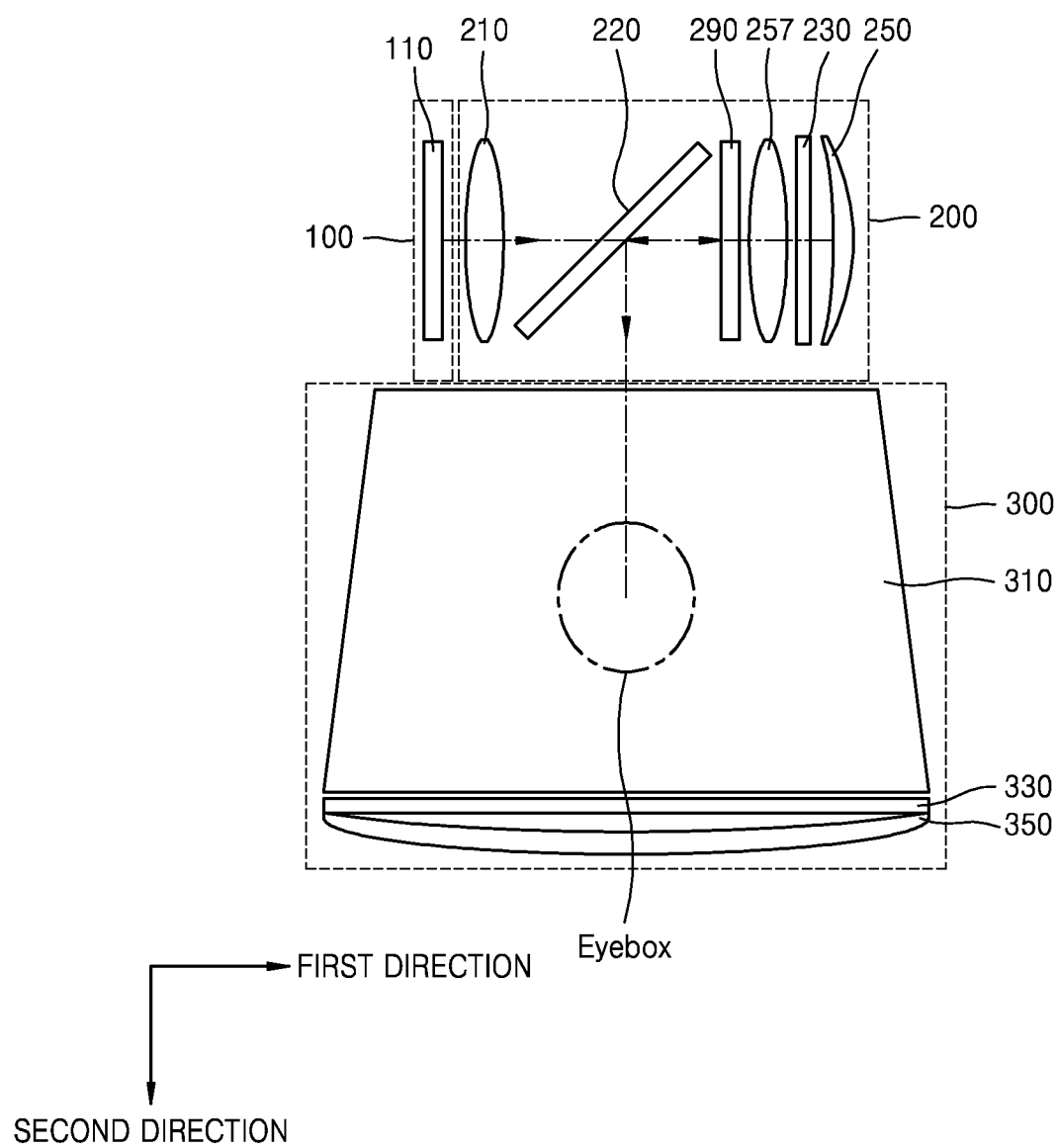
FIG. 10 schematically shows a see-through type display apparatus according to another example embodiment.

The see-through type display apparatuses according to the various example embodiments described above with reference to FIGS. 1 to 8 may include the image forming unit 100 including the display 110 forming a first image and the display 130 forming a second image to form a multi-focal point but the example embodiments are not limited thereto. As shown in FIGS. 9 to 11, a see-through type display apparatuses may include an image forming unit 100 including a single display 110 and additional configurations for implementing the multi-focal point.

FIG. 9 schematically shows a see-through type display apparatus according to another example embodiment.

The see-through type display apparatus of the example embodiment of FIG. 9 is different from the see-through type display apparatus of the example embodiment of FIG. 2 in that the see-through type display apparatus of FIG. 9 includes a single display 110 in the image forming unit 100, further includes the condensing mirror member 255 and the polarization converter 235 on a side of the first polarizer 220, opposite the optical combiner 300, and further includes a polarization rotator 290 between the image forming unit 100 and the first polarizer 220 to change a polarization state of light passing therethrough to a first polarization and a second polarization according to a time sequence. In an example embodiment, a transmission polarization component and a reflection polarization component of the first polarizer 220 may be provided to display images at different focal positions via the condensing mirror members 250 and 255, respectively, according to a polarization state of an image that is incident on the first polarizer 220 via the polarizer 290 and which changes over time. The condensing mirror members 250 and 255 may have different focal points or object distances to display images on different planes according to polarization. The display images may be synchronized with appropriate images according to focal positions to be displayed.

Although the polarization rotator 290 is positioned between the first lens 210 and the first polarizer 220 and thus included in the relay optical system 200 in FIG. 9, a position of the polarization rotator 290 may change. In an example embodiment, the polarization rotator 290 may be disposed in the image forming unit 100, between the single display 110 and the first lens 210.

In a case in which a polarization state of a display image provided by the image forming unit 100 is a second polarization, that is transmitted through the first polarizer 220, when the polarization rotator 290 is turned off, light of the second polarization which is incident on the image forming unit 100 and is transmitted through the polarization rotator 290 without a polarization change is transmitted through the first polarizer 220 and is incident on the polarization converter 230. The light is then transmitted through the polarization converter 230, thereby being converted to, for example, light having one circular polarization, is reflected and focused by the condensing mirror member 250, thereby being converted to, for example, light having an other circular polarization, orthogonal to the one circular polarization, and is retransmitted through the polarization converter 230, thereby being converted into a first polarization. The light of the first polarization is then reflected by the first polarizer 220 and directed to the optical combiner 300.

When the polarization rotator 290 is turned off, since the light of second polarization is transmitted from the polarization rotator 290, the light of second polarization is transmitted through the first polarizer 220, is reflected and focused by the converging mirror member 250, is converted into first polarization by the polarization converter 230, and is thus directed to the first polarizer 220. The light of first polarization that is incident again on the first polarizer 220 is reflected by the first polarizer 220 and directed to the optical combiner 300.

When the polarizing rotator 290 is turned on, the light of second polarization transmitted from the image forming unit 100 is changed to a first polarization by the polarizing rotator 290, is reflected by the first polarizer 220, and is incident on the polarization converter 235. The light is transmitted through the polarization converter 235 and is thereby converted into light having, for example, one circular polarization, is reflected and condensed by the condensing mirror member 255, thereby being converted into, for example, light of an other circular polarization, and is retransmitted through the polarization converter 235, thereby being converted into the second polarization. The light of the second polarization is transmitted through the first polarizer 220 and is directed towards the optical combiner 300.

When the polarization rotator 290 is turned on, since the light of first polarization is transmitted from the polarizing rotator 290, the light of first polarization is reflected by the first polarizer 220, is reflected and condensed by the condensing mirror member 255, is converted into light having the second polarization by the polarization converter 235, and is incident again on the first polarizer 220. The light of second polarization that is incident again on the first polarizer 220 is transmitted through the first polarizer 220 and is directed to the optical combiner 300.

When the polarization state of the display image is changed over time using the polarization rotator 290 while using one display 110 as described above, the light of second polarization transmitted through the first polarizer 220 and the light of first polarization reflected by the first polarizer 220 display images at different focal positions via the condensing mirror members 250 and 255, respectively, according to the polarization state changed over time. The condensing mirror members 250 and 255 may have different focal points or object distances to thereby display images on different planes according to the polarization. The display images may be synchronized with appropriate images according to focal positions to be displayed. When the relay optical system 200 including a single panel and the polarization rotator 290 is replaced to implement a multi-focal point, instead of two panels, the overall size of the multi-focal module implemented with a combination of the image forming unit 100 and the relay optical system 200 may be greatly reduced.

FIG. 10 schematically shows a see-through type display apparatus according to another example embodiment.

The see-through type display apparatus of the example embodiment of FIG. 10 is different from the see-through type display apparatus of the example embodiment of FIG. 9 in that the see-through type display apparatus of FIG. 10 does not include the condensing mirror member 255 and the polarization converter 230, but does include the polarization rotator 290 for changing a polarization state of light transmitted therethrough to a first polarization and a second polarization according to a time sequence between the first polarizer 220 and the polarization converter 230, and also includes a birefringent lens 257 between the polarization rotator 290 and the polarization converter 230. Since the birefringent lens 257 has different refractive indexes according to the polarization of incident light thereon, the birefringent lens 257 has different focal lengths with respect to light of different polarizations, and thus, the see-through type display apparatus of FIG. 10 may have a multi-focal characteristic.

In a case in which a polarization state of a display image provided by the image forming unit 100 is the second polarization that is transmitted through the first polarizer 220, when the polarization rotator 290 is turned off, light of the second polarization transmitted from the image forming unit 100 and through the first polarizer 220 is transmitted through the polarizing rotator 290 without a polarization change, is subject to a first refractive index n1 upon transmission through the birefringent lens 257, and is made incident on the polarization converter 230. The light may be made to have one circular polarization, for example, right circular polarization, upon transmission through the polarization converter 230, is converted to light of another orthogonal circular polarization, for example, left circular polarization, upon reflection by the condensing mirror member 250, and is converted into light of the first polarization upon retransmission through the polarization converter 230. The thus converted light of first polarization is subject to a second refractive index n2 upon retransmission through the birefringent lens 257 and will be transmitted through the polarization rotator 290 without a further polarization change, be reflected by the first polarizer 220, and be directed toward the optical combiner 300.

When the polarizing rotator 290 is turned on, light of second polarization that is transmitted from the image forming unit 100 and through the first polarizer 220 is changed to the light of the first polarization by the polarizing rotator 290, is subject to the second refractive index n2 upon transmission through the birefringent lens 257 and is made incident on the polarization converter 230. The light is transmitted through the polarization converter 230 and converted of light having, for example, left circular polarization, upon transmission through the polarization converter 230, is reflected and condensed by the condensing mirror member 250 and thereby converted to light having an orthogonal right circular polarization, and is retransmitted through the polarization converter 230, and thereby converted into light having the second polarization. The thus converted light of the second polarization is subject to the first refractive index n1 upon retransmission through the birefringent lens 257, is converted into light having the first polarization by the polarization rotator 290, is reflected by the first polarizer 220, and is directed toward the optical combiner 300.

When the order of refractive indexes that the light transmitted through the birefringent lens 257 undergoes, is changed by changing the polarization state of the display image using the polarization rotator 290 in the time order while using one display 110, since the refractive index encountered by the light incident on the birefringent lens 257 effectively changes over time according to the change of the polarization state of the light, the degree of the light focused by the birefringent lens 257 towards the condensing mirror member 250 and a degree of the light incident on the birefringent lens 257 after being reflected and focused by the condensing mirror member 250 that is focused by the birefringent lens 257 onto the optical combiner 300 may vary. Therefore, when the polarization state of the display image is changed over time using the polarization rotator 290, focal lengths obtained by a combination of the birefringent lens 257 and the condensing mirror member 250 may be vary, and thus the see-through type display apparatus may have a multi-focal characteristic.

Therefore, the multi-focus characteristic may be implemented by two images imaged on different planes using the combination of the birefringent lens 257 and the condensing mirror member 250.

Figure 11A:
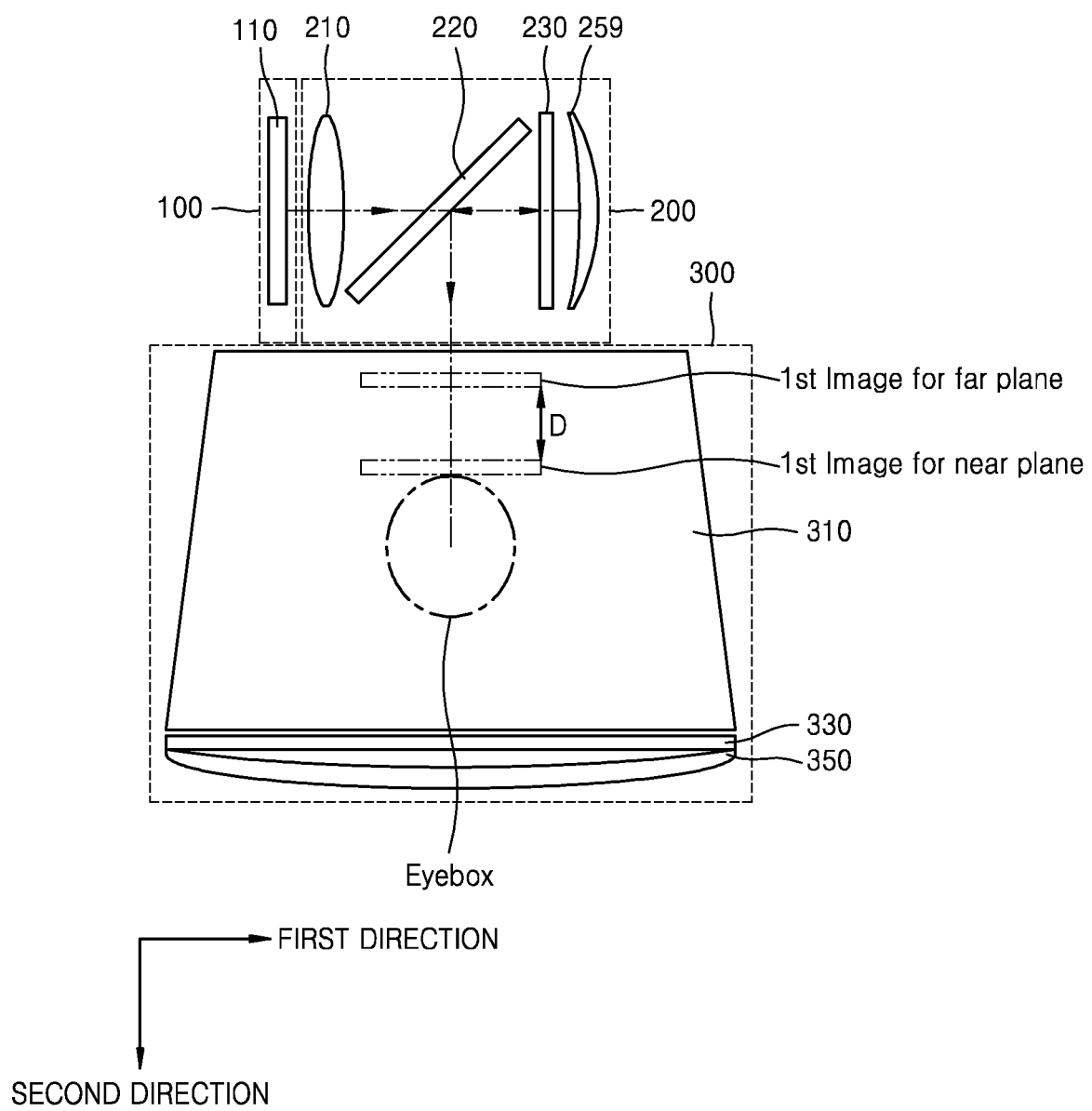
FIGS. 11A and 11B schematically show a see-through type display apparatus according to another example embodiment.
Figure 11B:
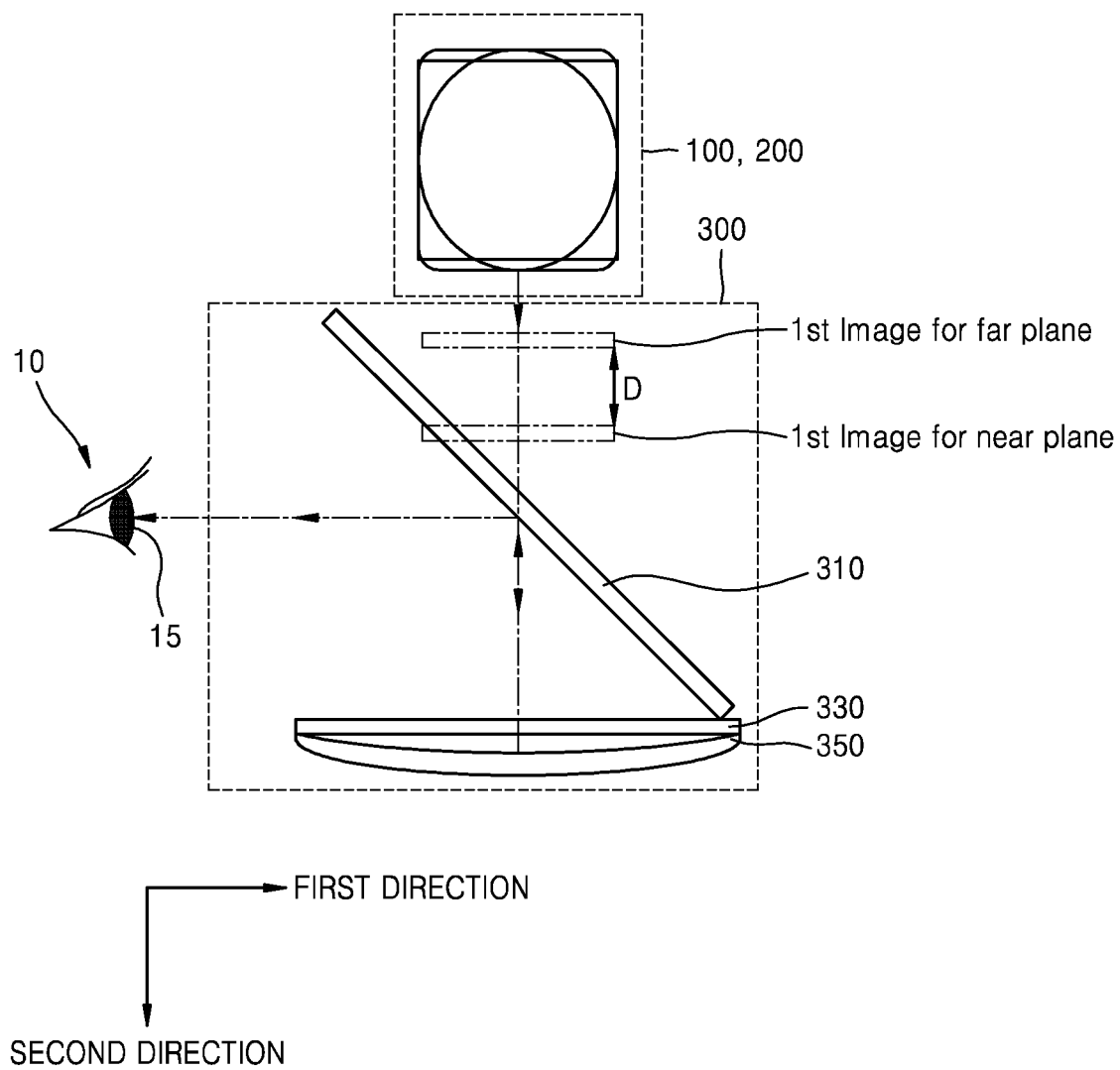

FIGS. 11A and 11B schematically show a see-through type display apparatus according to another example embodiment.

The see-through type display apparatus of the example embodiments of FIGS. 11A and 11B is different from the see-through type display apparatus of the example embodiment of FIG. 10 in that the see-through type display apparatuses of FIGS. 11A and 11B do not include the polarization rotator 290 and the birefringent lens 257, but include a condensing mirror member 259 capable of varying focusing power, and thereby a focal point of the relay optical system 200 is changed.

The condensing mirror member 259 may be a programmable mirror device and include a MEMS mirror or a liquid crystal-based focusing variable lens. When a liquid crystal-based focusing variable lens is provided as the programmable mirror device, a reflective layer may further be provided on a back surface of the liquid crystal-based focusing variable lens. The condensing mirror member 259 may include a combination of a reflection mirror and a transmission liquid crystal-based focusing variable lens.

When the programmable mirror device is a condensing mirror member 259, since the focusing power may be modified within a certain range from power 1 to power N, a focal point of the relay optical system 200 may be varied over a continuous depth. A natural volume image may thereby be displayed when the display 110 displays an image synchronized with each depth plane.

According to a see-through type display apparatus according to the various example embodiments as described above, a display image may be initially imaged in the optical combiner 300 by using a small-sized relay optical system 200 including the first polarizer 220, for example, a wire grid polarizer and the polarization converter 230, for example, a ¼ wavelength plate. Utilizing such a relay optical system 200, since a light path is used redundantly, a small size may be maintained.

Also, according to a see-through type display apparatus according to the various example embodiments, a multi-focal point may be implemented by the image forming unit 100 including the plurality of displays 110 and 130, or by the image forming unit 100 including the single display 110 and the relay optical system 200 including, for example, the polarization rotator 290, the birefringent lens 257, a programmable mirror, or the like.

According to a see-through type display apparatus according to the various example embodiments, a multi-focal function may display a natural virtual image regardless of near and far distances and implement a wide viewing angle.

Figure 12A:
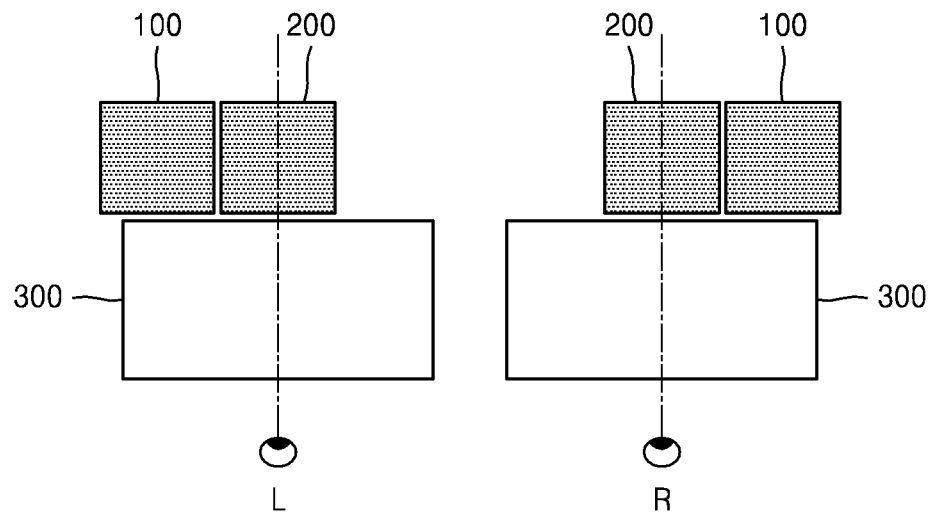
FIGS. 12A and 12B show an example in which a see-through type display apparatus according to an example embodiment is implemented as a pair of left and right symmetrical glasses-type apparatus.
Figure 12B:
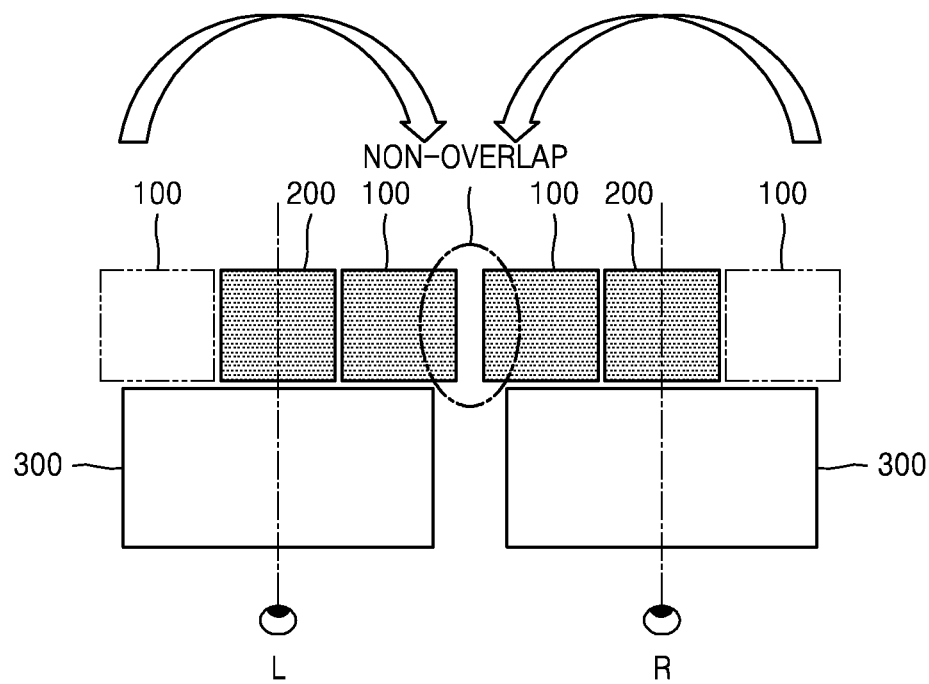

A see-through type display apparatus according to the various example embodiments as described above may be implemented as a pair of left and right symmetrical glasses-type apparatuses, for example, an AR glasses-type apparatus as shown in FIGS. 12A and 12B.

In an example embodiment, a pair of units, each comprising the image forming unit 100, the relay optical system 200, and the optical combiner 300, for a left eye L and a right eye R may be provided symmetrically.

FIG. 12A shows a case where the image forming unit 100 is disposed outside the relay optical system 200. FIG. 12B shows a case where the image forming unit 100 is disposed inside the relay optical system 200 without overlapping.

As shown in FIGS. 12A and 12B, according to the see-through type display apparatus according to an example embodiment, since the relay optical system 200 may be implemented to have a size, sufficient space may be secured to place the relay optical system 200 inside the image forming unit 100 with respect to the both eyes L and R of a user wearing the glasses-type apparatus.

Figure 13A:
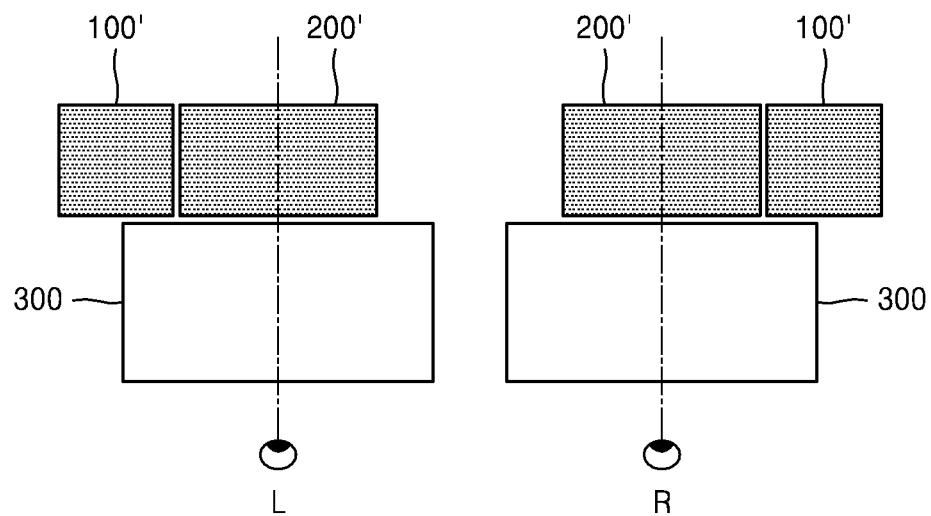
FIGS. 13A and 13B show an example in which a see-through type display apparatus of a comparative example is implemented as a pair of left and right symmetrical glasses-type apparatuses.
Figure 13B:
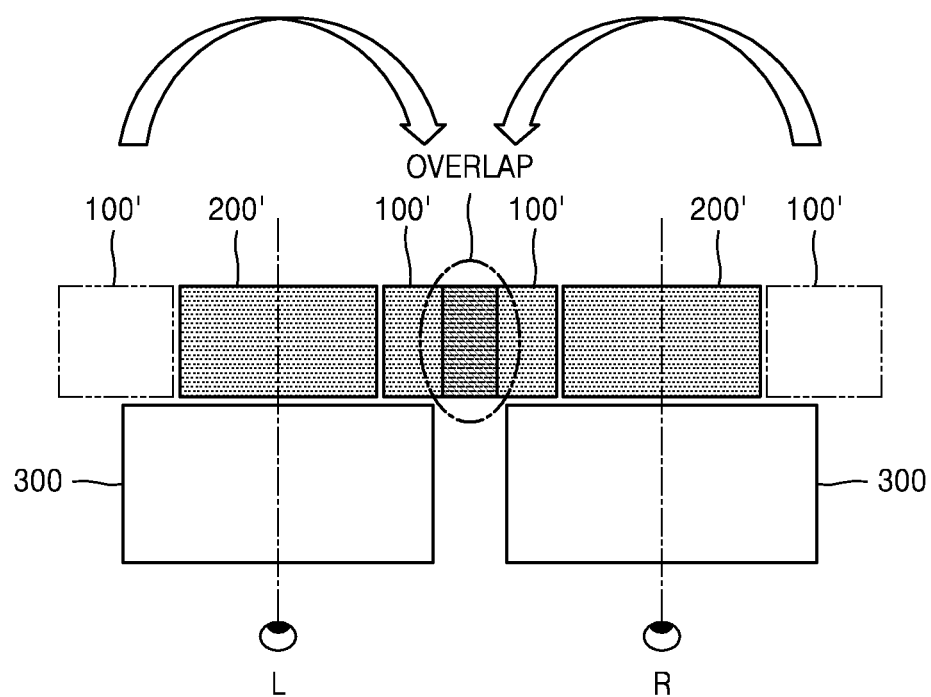

FIGS. 13A and 13B show an example in which the apparatus of the comparative example of FIG. 4 is implemented as a pair of left and right symmetrical glasses-type apparatuses. Since the relay optical system 200 of the comparative example does not have a small size, the image forming unit 100 may be disposed outside the relay optical system 200 as shown in FIG. 13A. However, as shown in FIG. 13B, the image forming unit 100 may not be disposed inside the relay optical system 200 due to an overlapping region.

Figure 14:
FIGS. 14 to 16 show various electronic devices to which see-through type display apparatuses according to example embodiments are applicable.
Figure 15:
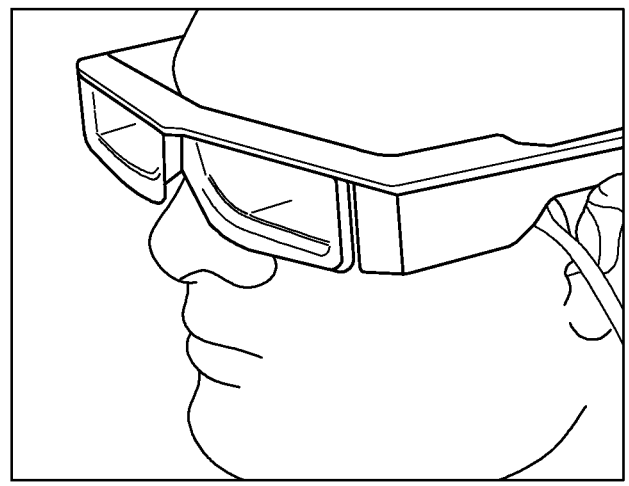
Figure 16:
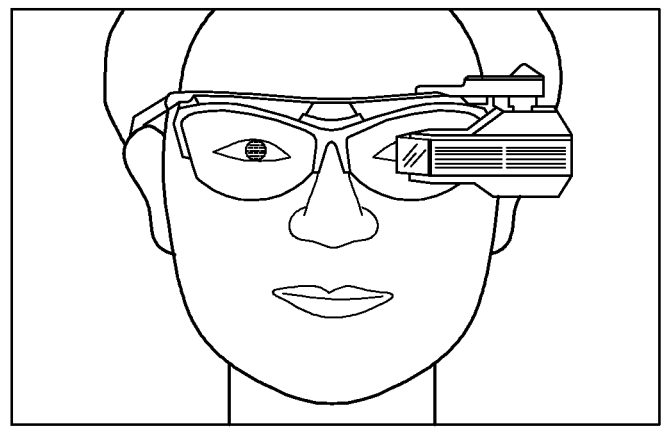

At least parts of the see-through type display apparatuses of the various example embodiments described above may constitute wearable devices. In other words, the see-through type display apparatuses may be applied to wearable devices. In an example embodiment, the see-through type display apparatuses may be applied to head-mounted displays (HMDs). Also, the see-through image display apparatuses may be applied to glasses-type displays or goggle-type displays. FIGS. 14 to 16 show various electronic devices to which see-through type display apparatuses according to example embodiments are applicable. The electronic devices of FIGS. 14 to 16 are examples of goggle-type apparatuses, HMDs, glasses-type apparatuses, etc. The wearable electronic devices shown in FIGS. 14 to 16 may interact with (or may be connected to) smartphones and be operated via the smartphones.

In addition, the see-through type display apparatuses of the various example embodiments may be included in smartphones, and the smartphones may be used as see-through type display apparatuses. In other words, the see-through type display apparatuses may be applied to compact electronic devices (mobile electronic devices). The application fields of the see-through type display apparatuses of the various embodiments may vary. For example, the see-through type display apparatuses of the various example embodiments may be not only used to implement AR or MR, but also used in other fields. In other words, the technical concepts of the various example embodiments may be applied not only to AR or MR, but also to multi-image displays through which a plurality of images may be simultaneously seen.

According to a see-through type display apparatus according to an example embodiment, a multi-focus image may be primarily imaged through a combination of a first lens and a condensing mirror member of a relay optical system, and a light path of a sufficient length may be secured by application of a first polarizer, and thus a small size may be maintained. As a result, a relay image may be formed in an optical combiner connected in a second direction, i.e. a vertical direction, and reimaging may be performed at a position close to the optical combiner, and thus the power of the optical combiner may increase and a wide viewing angle may be provided.

Further, when such a see-through type display apparatus is applied, a see-through type display apparatus having a small size, for example, an AR glasses-type apparatus may be realized by reducing a length of the relay optical system.

It should be understood that the example embodiments described herein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. A see-through type display apparatus comprising:
    an image forming unit configured to transmit an image;
    a relay optical system configured to receive the image transmitted by the image forming unit and to transmit a primary imaging image; and
    an optical combiner configured to receive the primary imaging image from the relay optical system and to form a multi-depth plane,
    wherein the relay optical system comprises:
    a first lens configured focus the image received from the image forming unit;
    a first polarizer positioned such that a surface normal of the first polarizer forms a non-zero angle with an optical axis of the first lens and configured to reflect light of a first polarization and transmit light of a second polarization, orthogonal to the first polarization;
    a condensing mirror configured to reflect and focus light incident thereon from the first polarizer; and
    a polarization converter provided to convert a polarization of light transmitted between the first polarizer and the condensing mirror member, such that light incident on the first polarizer from the condensing mirror has the first polarization, and the light incident on the condensing mirror from the first polarizer has the second polarization.

2. The see-through type display apparatus of claim 1, wherein the image is transmitted by the image forming unit and received by the relay optical system on a first optical path extending in a first direction,
    wherein the primary imaging image is transmitted by the relay optical system and received by the optical combiner on a second optical path extending in a second direction.

3. The see-through type display apparatus of claim 2, configured to be worn over both eyes of a user,
    wherein the image forming unit is positioned in the see-through type display apparatus between portions of the see-through type display apparatus configured to align with the both eyes of the user or is positioned in the see-through type display apparatus outside the portions of the see-through type display apparatus configured to align with the both eyes of the user.

4. The see-through type display apparatus of claim 1, wherein the condensing mirror member comprises a concave mirror.

5. The see-through type display apparatus of claim 4, further comprising:
    a second lens between the polarization converter and the concave mirror.

6. The see-through type display apparatus of claim 1, wherein the condensing mirror member comprises a doublet mirror including a lens and a concave mirror.

7. The see-through type display apparatus of claim 1, wherein the first lens comprises a single lens.

8. The see-through type display apparatus of claim 1, wherein the first lens comprises a doublet lens including a convex lens and a concave lens.

9. The see-through type display apparatus of claim 1, wherein the first polarizer is a wire grid polarizer.

10. The see-through type display apparatus of claim 1, wherein the see-through type display apparatus is configured to be worn by a user as one of a glasses-type apparatus, a goggle-type apparatus and a head-mounted display apparatus.

11. The see-through type display apparatus of claim 1,
    wherein the first polarizer comprises a polarization selective transmission reflective surface, wherein the polarization selective transmission reflective surface faces towards the image forming unit,
    wherein the condensing mirror member comprises a first condensing mirror member and a second condensing mirror member and the polarization converter comprises a first polarization converter and a second polarization converter;
    wherein the light of the second polarization transmitted through the first polarizer is transmitted through the first polarization converter, reflected by the first condensing mirror member, transmitted again through the first polarization converter, is incident on the first polarizer as light of the first polarization, and is reflected by the first polarizer and thereby directed toward the optical combiner;
    wherein the light of the first polarization reflected by the first polarizer is transmitted through the second polarization converter, reflected from the second condensing mirror, transmitted again through the second polarization converter, is incident on the first polarizer as light of the second polarization, and is transmitted through the first polarizer and thereby directed to the optical combiner.

12. The see-through type display apparatus of claim 11, further comprising:
    a second polarizer, between the image forming unit and the first polarizer, configured to transmit only light having the second polarization.

13. The see-through type display apparatus of claim 1,
    wherein the image transmitted by the image forming unit comprises a first image and a second image;
    wherein the image forming unit comprises:
    a first display configured to form the first image;
    a second display configured to form the second image; and
    a beam splitter configured to transmit the first image toward the relay optical system and to reflect the second image toward the relay optical system, and
    wherein the image forming unit is configured to form a multi-focal point.

14. The see-through type display apparatus of claim 13, wherein the first polarizer comprises a polarization selective transmission reflective surface, wherein the polarization selective transmission reflective surface faces away from the image forming unit.

15. The see-through type display apparatus of claim 1, wherein the image forming unit comprises:

a single display configured to form the image, wherein the first polarizer comprises a polarization selective transmission reflective surface, wherein the polarization selective transmission reflective surface faces away from the image forming unit; and a polarization rotator, between the image forming unit and the first polarizer, configured to switch between converting a polarization of light transmitted therethrough into the first polarization and converting the polarization of light transmitted therethrough into the second polarization, wherein the condensing mirror member comprises a first condensing mirror member and a second condensing mirror member and the polarization converter comprises a first polarization converter and a second polarization converter;

wherein the light of the second polarization transmitted through the polarization rotator is transmitted through the first polarization converter, reflected by the first condensing mirror member, transmitted again through the first polarization converter, is incident on the first polarizer as light of the first polarization, and is reflected by the first polarizer and thereby directed toward the optical combiner;

wherein the light of the first polarization transmitted through the polarization rotator is transmitted through the second polarization converter, reflected by the second condensing mirror, transmitted again through the second polarization converter, is incident on the first polarizer as light of the second polarization, and is transmitted by the first polarizer and thereby directed toward the optical combiner; and wherein the condensing mirror member and the polarization converter are configured to implement a multi-focal point.

16. The see-through type display apparatus of claim 1, wherein the image forming unit comprises:

a single display configured to form the image, wherein the first polarizer comprises a polarization selective transmission reflective surface, wherein the polarization selective transmission reflective surface faces away from the image forming unit;

a polarization rotator, between the first polarizer and the polarization converter, configured to switch between converting a polarization state of light transmitted therethrough according to on and off states; and a birefringent lens, between the polarization rotator and the polarization converter, and wherein the image forming unit is configured to implement a multi-focal point.

17. The see-through type display apparatus of claim 1, wherein the image forming unit comprises a single display configured to form the image, and wherein the condensing mirror member is configured to vary a focusing power to change a focus of the relay optical system.

18. The see-through type display apparatus of claim 17, wherein the condensing mirror member comprises a programmable mirror device capable of modifying the focusing power within a range.

19. The see-through type display apparatus of claim 18, wherein the programmable mirror device comprises one of a Micro-Electro-Mechanical systems (MEMS) mirror and a liquid crystal-based focus variable lens.

20. A transparent display apparatus comprising:

an image forming unit;

a relay optical system; and an optical combiner;

wherein the image forming unit comprises a display and is configured to transmit an image to the relay optical system;

wherein the relay optical system comprises:

a lens configured to focus the image transmitted by the image forming unit;

a polarizer configured to reflect light of a first polarization and transmit light of a second polarization;

a condensing mirror; and a polarization converter disposed on an optical path between the polarizer and the condensing mirror.

* * * * *